US012572524B2

(12) United States Patent
Aya et al.

(10) Patent No.: US 12,572,524 B2
(45) Date of Patent: Mar. 10, 2026

(54) UNIFIED TABLE DATA ACCESS IN USER-SPECIFIED FORMATS ON INTERNAL STORAGE AND USER-MANAGED STORAGE

(71) Applicant: Snowflake Inc., Bozeman, MT (US)

(72) Inventors: Selcuk Aya, Izmir (TR); Thierry Cruanes, San Mateo, CA (US); Istvan Cseri, Seattle, WA (US); Benoit Dageville, San Mateo, CA (US); Marcia Feitel, Sunnyvale, CA (US); Steven P. Herbert, Woodinville, WA (US); Dennis Huo, Newcastle, WA (US); Xinglian Liu, Redmond, WA (US); Nithin Mahesh, Kirkland, WA (US); James Malone, Seattle, WA (US); Subramanian Muralidhar, Mercer Island, WA (US); Muthunagappan Muthuraman, Sunnyvale, CA (US); Ronald Lee Ortloff, Sammamish, WA (US); Polita Paulus, Kirkland, WA (US); Marianne Shaw, Bothell, WA (US); Nileema Shingte, San Mateo, CA (US); Wai Sing Wong, Bellevue, WA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/517,744

(22) Filed: Nov. 22, 2023

(65) Prior Publication Data
US 2024/0427755 A1     Dec. 26, 2024

Related U.S. Application Data

(63) Continuation of application No. 18/498,463, filed on Oct. 31, 2023, now Pat. No. 12,050,582.

(Continued)

(51) Int. Cl.
| | | |
|---|---|---|
| *G06F 16/22* | (2019.01) | |
| *G06F 16/215* | (2019.01) | |
| *G06F 16/2457* | (2019.01) | |

(52) U.S. Cl.
CPC ........ *G06F 16/2282* (2019.01); *G06F 16/215* (2019.01); *G06F 16/24573* (2019.01)

(58) Field of Classification Search
CPC ...................... G06F 16/2282; G06F 16/24573
(Continued)

(56) References Cited

U.S. PATENT DOCUMENTS

| | | | | | |
|---|---|---|---|---|---|
| 5,603,024 | A | * | 2/1997 | Goldring ............. | G06F 16/2358 |
| | | | | | 707/999.203 |
| 6,289,335 | B1 | * | 9/2001 | Downing .............. | G06F 16/219 |
| | | | | | 707/999.102 |

(Continued)

OTHER PUBLICATIONS

"U.S. Appl. No. 18/498,463, Non Final Office Action mailed Jan. 2, 2024", 18 pages.
"U.S. Appl. No. 18/498,463, Response filed Apr. 1, 2024 to Non Final Office Action mailed Jan. 2, 2024", 10 pages.
"U.S. Appl. No. 18/193,069, Non Final Office Action mailed Jun. 13, 2023".

(Continued)

*Primary Examiner* — Muluemebet Gurmu
(74) *Attorney, Agent, or Firm* — Schwegman Lundberg & Woessner, P.A.

(57) ABSTRACT

The subject technology provides embodiments for supporting a unified table which may be a managed table or an unmanaged table. Managed tables are those where the subject technology manages the metastore/catalog for the table, whereas unmanaged tables are tables where an external catalog controls the table and the subject technology integrates with that catalog to work with the table, but does not assume control of the table.

16 Claims, 20 Drawing Sheets

Related U.S. Application Data

(60) Provisional application No. 63/509,885, filed on Jun. 23, 2023.

(58) Field of Classification Search
USPC .......................................................... 707/687
See application file for complete search history.

(56) References Cited

U.S. PATENT DOCUMENTS

| | | | |
|---|---|---|---|
| 9,830,335 B1 * | 11/2017 | Tibble | ................. G06F 16/1873 |
| 11,899,646 B2 | 2/2024 | Aya et al. | |
| 2012/0117054 A1 | 5/2012 | Shrinivas et al. | |
| 2014/0006858 A1 | 1/2014 | Helfman et al. | |
| 2017/0212953 A1 * | 7/2017 | Oberhofer | ........... G06F 16/2282 |
| 2017/0262348 A1 | 9/2017 | Hsieh et al. | |
| 2018/0196832 A1 | 7/2018 | Maybee et al. | |
| 2019/0163754 A1 | 5/2019 | Huang et al. | |
| 2020/0334240 A1 * | 10/2020 | Muralidhar | ............. G06F 3/067 |
| 2023/0401193 A1 | 12/2023 | Aya et al. | |

OTHER PUBLICATIONS

"U.S. Appl. No. 18/193,069, Notice of Allowance mailed Sep. 29, 2023", 7 pgs.

"U.S. Appl. No. 18/193,069, Response filed Sep. 11, 2023 to Non Final Office Action mailed Jun. 13, 2023", 16 pgs.

"International Application Serial No. PCT/US2023/024799, International Search Report mailed Jul. 14, 2023", 2 pgs.

"International Application Serial No. PCT/US2023/024799, Written Opinion mailed Jul. 14, 2023", 7 pgs.

"Using Apache Iceberg", Cloudera Runtime, (Mar. 15, 2022), 45 pgs.

O'Malley, Owen, et al., "Iceberg; A modern table format for big data", (Sep. 2018), 34 pgs.

"U.S. Appl. No. 18/498,463, Notice of Allowance mailed Apr. 25, 2024", 11 pgs.

"International Application Serial No. PCT/US2024/034136, International Search Report mailed Jul. 23, 2024", 2 pgs.

"International Application Serial No. PCT/US2024/034136, Written Opinion mailed Jul. 23, 2024", 7 pgs.

* cited by examiner

900

1000

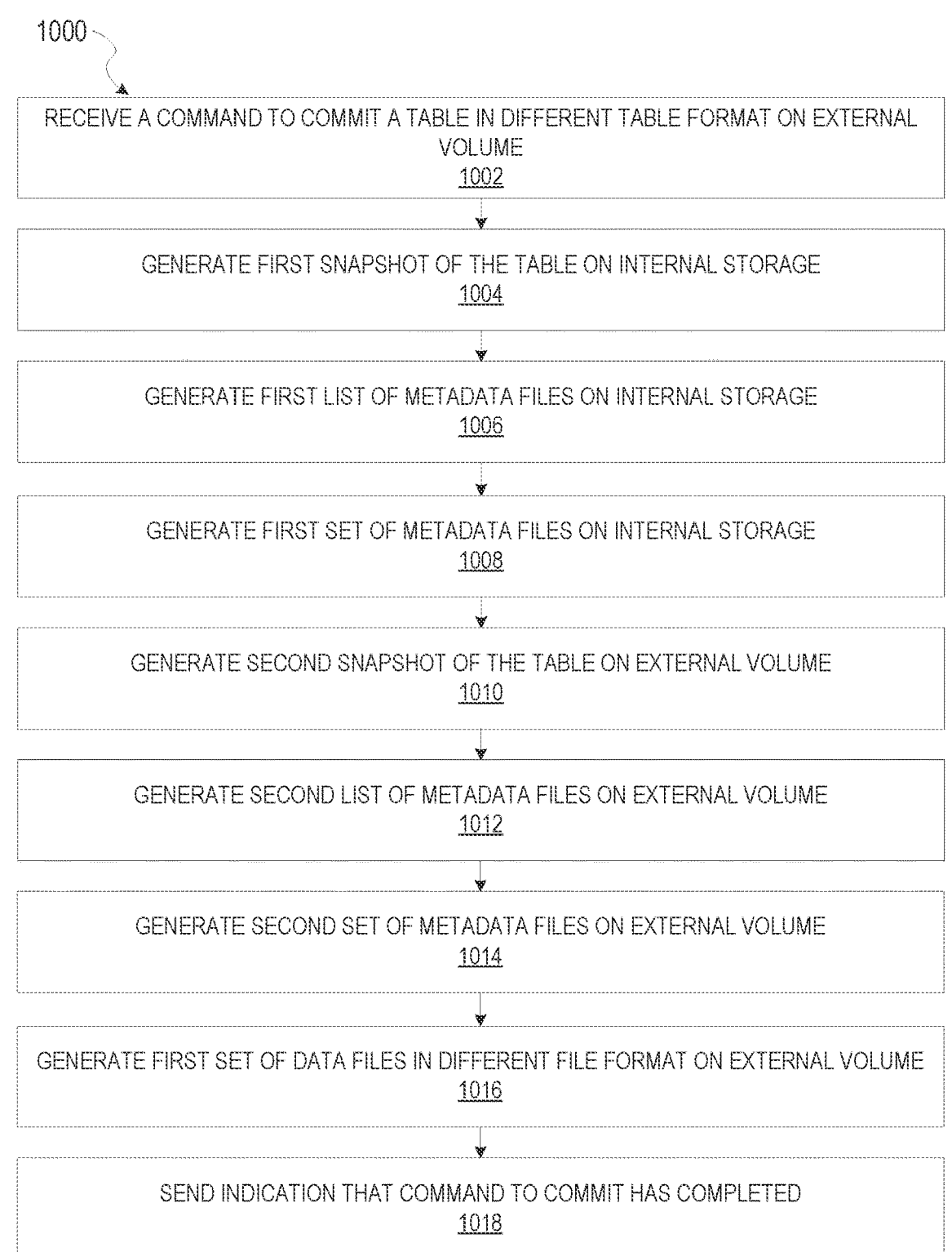

RECEIVE A COMMAND TO COMMIT A TABLE IN DIFFERENT TABLE FORMAT ON EXTERNAL VOLUME
1002

GENERATE FIRST SNAPSHOT OF THE TABLE ON INTERNAL STORAGE
1004

GENERATE FIRST LIST OF METADATA FILES ON INTERNAL STORAGE
1006

GENERATE FIRST SET OF METADATA FILES ON INTERNAL STORAGE
1008

GENERATE SECOND SNAPSHOT OF THE TABLE ON EXTERNAL VOLUME
1010

GENERATE SECOND LIST OF METADATA FILES ON EXTERNAL VOLUME
1012

GENERATE SECOND SET OF METADATA FILES ON EXTERNAL VOLUME
1014

GENERATE FIRST SET OF DATA FILES IN DIFFERENT FILE FORMAT ON EXTERNAL VOLUME
1016

SEND INDICATION THAT COMMAND TO COMMIT HAS COMPLETED
1018

FIG. 10

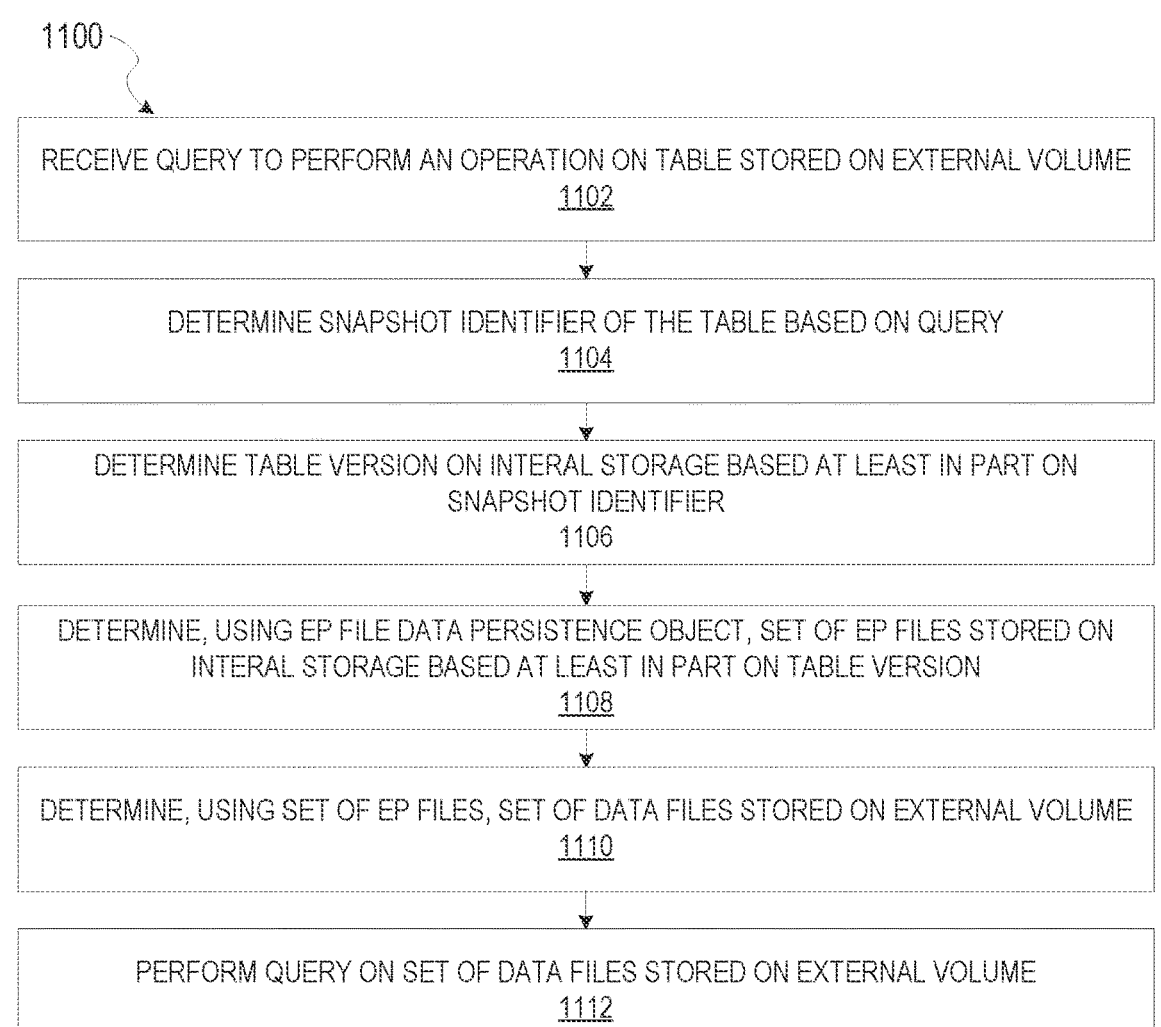

1100

RECEIVE QUERY TO PERFORM AN OPERATION ON TABLE STORED ON EXTERNAL VOLUME
1102

DETERMINE SNAPSHOT IDENTIFIER OF THE TABLE BASED ON QUERY
1104

DETERMINE TABLE VERSION ON INTERAL STORAGE BASED AT LEAST IN PART ON
SNAPSHOT IDENTIFIER
1106

DETERMINE, USING EP FILE DATA PERSISTENCE OBJECT, SET OF EP FILES STORED ON
INTERAL STORAGE BASED AT LEAST IN PART ON TABLE VERSION
1108

DETERMINE, USING SET OF EP FILES, SET OF DATA FILES STORED ON EXTERNAL VOLUME
1110

PERFORM QUERY ON SET OF DATA FILES STORED ON EXTERNAL VOLUME
1112

*FIG. 11*

1200

GENERATE NEW VERSION OF SET OF EP FILES ON INTERNAL STORAGE
1202

GENERATE NEW EP FILE DATA PERSISTENCE OBJECT THAT MAPS NEW VERSION OF SET OF EP FILES TO NEW SET OF MANIFEST FILES ON EXTERNAL VOLUME
1204

GENERATE NEW SET OF MANIFEST FILES OF TABLE ON EXTERNAL VOLUME
1206

GENERATE NEW MANIFEST LIST BASED ON NEW SET OF MANIFEST FILES ON EXTERNAL VOLUME
1208

GENERATE NEW METADATA FILE THAT POINTS TO NEW MANIFEST LIST ON EXTERNAL VOLUME
1210

GENERATE NEW ROW IN EXTERNAL METADATA FILE TABLE THAT INCLUDES AT LEAST LOCATION OF NEW METADATA FILE ON EXTERNAL VOLUME AND NEW SNAPSHOT ID OF TABLE ON EXTERNAL VOLUME
1212

GENERATE MULTIPLE JOBS
1702

GENERATE A SET OF FILES
1704

GENERATE EXPRESSION PROPERTY FILES
1706

COMMIT TABLE
1708

1900

UNIFIED TABLE DATA ACCESS IN USER-SPECIFIED FORMATS ON INTERNAL STORAGE AND USER-MANAGED STORAGE

CROSS-REFERENCE TO RELATED APPLICATIONS

This application is a continuation of U.S. patent application Ser. No. 18/498,463, filed on Oct. 31, 2023, entitled "UNIFIED TABLE DATA ACCESS IN USER-SPECIFIED FORMATS ON INTERNAL STORAGE AND USER-MANAGED STORAGE," which claims priority to U.S. Provisional Patent Application Ser. No. 63/509,885, filed Jun. 23, 2023, entitled "UNIFIED TABLE DATA ACCESS IN USER-SPECIFIED FORMATS ON INTERNAL STORAGE AND USER-MANAGED STORAGE," and the contents of each are incorporated herein by reference in their entirety for all purposes.

TECHNICAL FIELD

Embodiments of the disclosure relate generally to a network-based database system or a cloud data platform and, more specifically, to external data stored in a different table format(s) than a table format utilized by the network-based database system.

BACKGROUND

Cloud-based network-based databases and other database systems or data platforms sometimes provide support for performing operations on external data. Such external data may be in a different table format or different file format.

BRIEF DESCRIPTION OF THE DRAWINGS

The present disclosure will be understood more fully from the detailed description given below and from the accompanying drawings of various embodiments of the disclosure.

FIG. 10 is a flow diagram illustrating operations of a database system in performing a method, in accordance with some embodiments of the present disclosure.

FIG. 11 is a flow diagram illustrating operations of a database system in performing a method, in accordance with some embodiments of the present disclosure.

FIG. 12 is a flow diagram illustrating operations of a database system in performing a method, in accordance with some embodiments of the present disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As discussed in embodiments herein, there are two types of storage in a network-based database system: 1) internal storage/tables, and 2) external tables. Internal tables provide many performance and benefits, while external tables are read only, lower performance, and offer other features or advantages. For a given user or entity, in many instances, only a portion or a copy of data are stored in internal storage or as internal tables while a remaining portion is stored in external tables. It is also appreciated that internal tables could be stored in a first format while external tables are stored in a second different format.

Such external tables as mentioned before could provide advantageous features. For example, external tables in an Iceberg format enable connecting data stored in Apache Iceberg format with the data cloud. Apache Iceberg is an open table format for huge analytic datasets that is increasing in popularity and usage across the user base, and is intended to be agnostic to processing engines and frameworks and to work across several file formats.

In embodiments described herein, Iceberg tables use an open metadata format (Apache Iceberg), an open file format (Apache Parquet), and store data in a specified location referred to as "external volumes" as discussed herein. In an implementation, Iceberg tables can provide similar performance to internal tables, the same features as internal tables (e.g., governance, encryption, replication, and the like), and can be used interchangeably with internal tables.

In embodiments, external volumes store Iceberg metadata and Parquet file data for Iceberg tables. In an example, such external volumes exist inside of a user managed storage location, and the subject system is enabled to access and perform operations the on external volumes in a manner that is easy and transparent to users while leveraging technical advantages of the subject system such as indexing, governance, encryption, and replication.

Although embodiments described herein mention Iceberg tables, it is appreciated that the subject system is enabled to support any appropriate external table format (e.g., Apache Hive ACID, Apache Hudi, and the like). Moreover, the subject system is enabled to support any appropriate file format in addition to the aforementioned Apache Parquet file format (e.g., CSV, XML, ORC, Avro, JSON, and the like).

Figure 1:
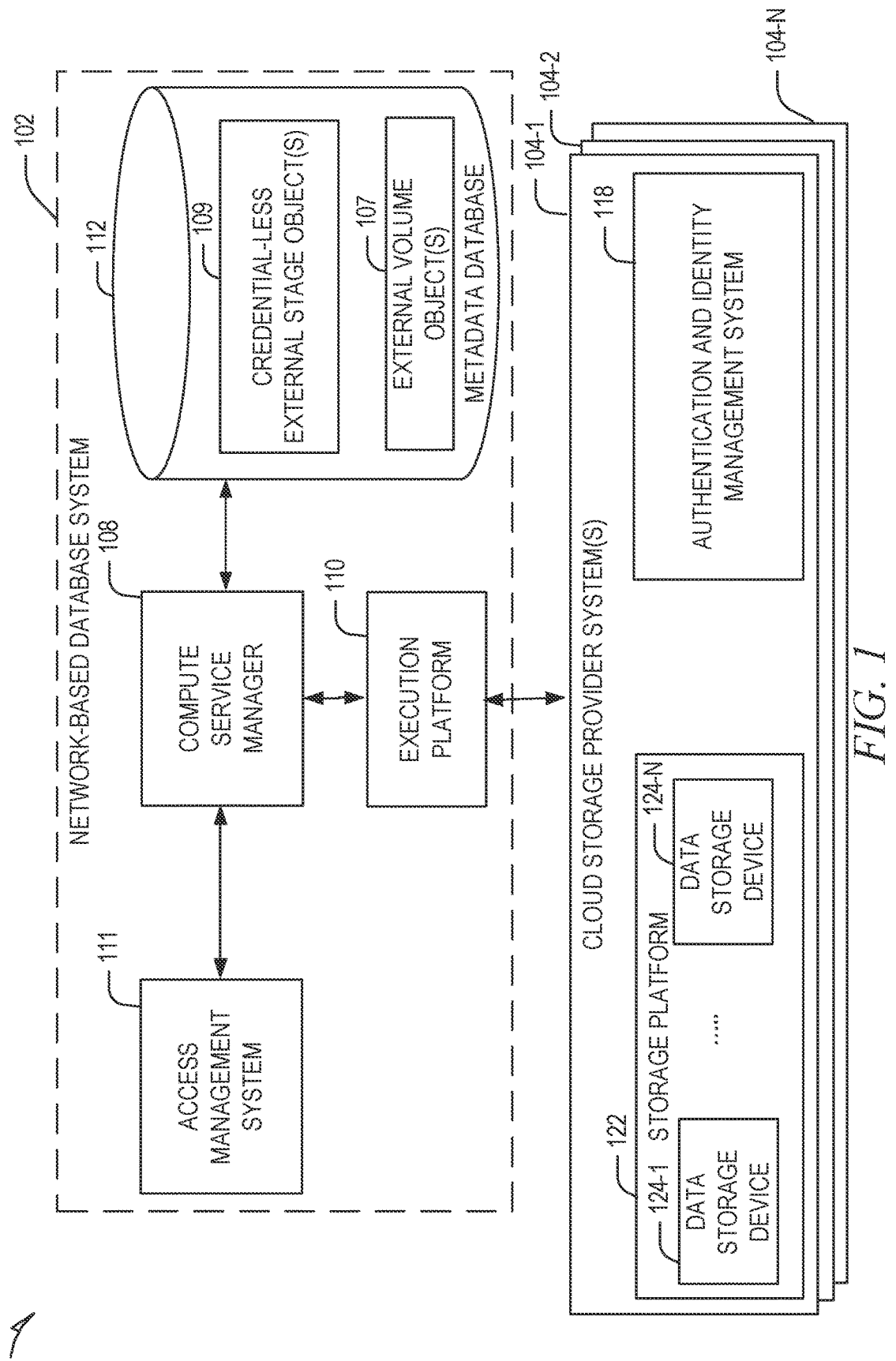
FIG. 1 illustrates an example computing environment that includes a network-based database system in communication with a cloud storage provider system, in accordance with some embodiments of the present disclosure.

FIG. 1 illustrates an example computing environment 100 that includes a network-based database system 102 in communication with at least one of a cloud storage provider system (e.g., cloud storage provider system 104-1, cloud storage provider system 104-2, cloud storage provider system 104-N), in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As noted above, external stages are used in network-based database systems to load data to and unload data from customer-managed storage locations, and conventional external stages must be provided with secret security credentials to enable access to these storage locations, which can create security vulnerabilities for the data. Aspects of the present disclosure address the above and other deficiencies of prior database functionality by creating credential-less external stage objects that do not require users to share secret security credentials with a network-based database system 102 to facilitate loading and unloading of data at storage locations in external cloud storage provider systems. The credential-less external state objects described herein also allow client account administrators to prevent data exfiltration through fine-grained control of access permissions.

Consistent with some embodiments, network-based database system 102 creates an integration object comprising an identifier of a storage location (e.g., a universal resource locator (URL)) in a storage platform of an external cloud storage provider system (e.g., Amazon Web Services® (AWS), Microsoft Azure Blob Storage®, or Google Cloud Storage) to which the network-based database system 102 is to be provided access to load and unload data. The integration object further comprises an identifier of a proxy identity object maintained by the external cloud storage provider system. Once created, the network-based database system 102 associates the integration object with a cloud identity object that the cloud storage provider system associates with the proxy identity object. The proxy identity object defines a proxy identity that is granted access to the storage location and may be assumed by the cloud identity object to load and unload data at the storage location.

The network-based database system 102 creates the integration object based on a command to create the storage integration. The command can be provided, for example, by an administrative user of a client account of the network-based database system 102. The cloud identity object that is associated with the integration object corresponds to the client account to which the user belongs. A storage integration definition comprises the identifier of the storage location, the identifier of the proxy identity object, and an identifier of the cloud storage provider system. The storage integration definition can, in some instances, further specify one or more storage locations to which access is permitted or denied. The storage definition object can specify certain segments within the storage location to which access is denied. For example, the storage location can be identified by a file path that corresponds to a storage resource within the storage platform such as a bucket or folder, and the command may specify a sub-folder within the file path to which access is denied. In another example, the command may specify one or more file paths to which access is permitted and in this example, access to all other file paths will be denied by default.

The network-based database system 102 creates an external stage object based on the storage integration object to load or unload data at the storage location. The external stage object comprises the identifier of the storage location and an identifier of the storage integration object. The network-based database system 102 creates the external stage object based on a command to create the external stage object provided, for example, by the user that provided the storage integration definition.

The network-based database system 102 can receive a command to load or unload data at the storage location. The command comprises an identifier of the external stage object. In response to the command, the network-based database system 102 utilizes the external stage object to load or unload data at the storage location in the storage platform of the external cloud storage provider. In doing so, the network-based database system 102 uses security credentials associated with the cloud identity object to access credentials to allow the cloud identity object to assume the proxy identity to load or unload the data. In this manner, the external stage object enables data to be loaded or unloaded at the storage location without exchanging security credentials associated with the storage location or storing the security credentials associated with the storage location with network-based database system 102 system.

Credential-less external stage objects, as described herein, separate the process of giving permissions to a storage location from the usage of that storage location to load and unload data. Credential-less external stage objects also allow organizations to give permissions to a network-based database system 102 to use their data locations instead of giving secret credentials to the network-based database system 102.

Organizations can specify what roles may create and use storage locations for access separately from who may create and use stages set up in advance. For instance, an organization may allow account administrators to create a connection to a storage location and because only the account administrators can create storage integrations, additional storage integrations cannot be created to export data to thereby prevent confidential data exfiltration to unknown locations. Once created, non-administrative users can be granted permissions to read and write from fixed storage locations into an external stage object they create. A lower privilege user may only have the ability to use an existing stage.

Users with permissions to create a storage integration can control what paths under a base location can be accessed using that integration. Giving account administrators the ability to specify which users may create and use storage integrations allow an organization to control where their internal data may flow to, or completely lock down data export altogether.

External credential-less stage objects also provide the benefit of allowing access permissions to storage to be managed by the cloud storage provider thereby allowing organizations utilizing the network-based database system 102 to leverage from their storage provider to manage data access by the network-based database system 102. If an account administrator decides to revoke access by the network-based database system 102 to a storage location, it can be done immediately using the access controls provided by the storage provider.

As shown, the computing environment 100 comprises the network-based database system 102 and one or more cloud storage provider systems (e.g., AWS®, Microsoft Azure Blob Storage®, or Google Cloud Storage) corresponding to cloud storage provider system 104-1, cloud storage provider system 104-2, and cloud storage provider system 104-N. The network-based database system 102 is a network-based system used for reporting and analysis of integrated data from one or more disparate sources including one or more storage locations within the cloud storage provider system 104-1. The cloud storage provider system 104-1 comprises a plurality of computing machines and provides on-demand computer system resources such as data storage and computing power to the network-based database system 102.

The network-based database system 102 comprises an access management system 111, a compute service manager 108, an execution platform 110, and a metadata database 112. The network-based database system 102 hosts and provides data reporting and analysis services to multiple client accounts. The access management system 111 enables administrative users of client accounts to manage access to resources and services provided by the network-based database system 102. Administrative users can create and manage identities (e.g., users, roles, and groups) and use permissions to allow or deny access to the identities to resources and services.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to metadata database 112, which is associated with the data stored in the computing environment 100. The metadata database 112 stores data pertaining to various functions and aspects associated with the network-based database system 102 and its users. For example, the metadata database 112 stores one or more external volume objects 107 and one or more credential-less external stage objects 109. An example of an external volume object is discussed in more detail in FIG. 6 below and enables access to an external volume as provided by embodiments of the subject system discussed herein.

In general, an external stage object 109 specifies a storage location (e.g., a URL) where data files are stored so that the data in the files can be loaded into a table stored internally by the network-based database system 102 or so that data from a table can be unloaded into the data files stored internally by the network-based database system 102. The one or more credential-less external stage objects 109 enable the network-based database system 102 to access storage locations within the cloud storage provider system 104-1 without storing, using, or otherwise accessing security credentials associated with the storage locations.

In some embodiments, the metadata database 112 includes a summary of data stored in remote data storage systems as well as data available from a local cache. Additionally, the metadata database 112 may include information regarding how data is organized in remote data storage systems (e.g., the cloud storage provider system 104-1) and the local caches. The metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to storage platform 122 of the cloud storage provider system 104-1. The storage platform 122 comprises multiple data storage devices 124-1 to 124-N, and each other storage platform can also include multiple data storage devices. In some embodiments, the data storage devices 124-1 to 124-N are cloud-based storage devices located in one or more geographic locations. For example, the data storage devices 124-1 to 124-N may be part of a public cloud infrastructure or a private cloud infrastructure. The data storage devices 124-1 to 124-N may be hard disk drives (HDDs), solid state drives (SSDs), storage clusters, Amazon S3™ storage systems or any other data storage technology. Additionally, the cloud storage provider system 104-1 may include distributed file systems (such as Hadoop Distributed File Systems (HDFS)), object storage systems, and the like. Similarly, any of the data storage devices in other cloud storage provider systems as discussed further herein can also have similar characteristics described above in connection with cloud storage provider system 104-1.

The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108, a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In addition to the storage platform 122, the cloud storage provider system 104-1 also comprises an authentication and identity management system 118. The authentication and identity management system 118 allows users to create and manage identities (e.g., users, roles, and groups) and use permissions to allow or deny access of the identities to cloud services and resources. The access management system 111 of the network-based database system 102 and the authentication and identity management system 118 of the cloud storage provider system 104-1 can communicate and share information so as to enable access and management of resources and services shared by users of both the network-based database system 102 and the cloud storage provider system 104-1.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 124-1 to 124-N are decoupled from the computing resources associated with the execution platform 110. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, metadata database 112, execution platform 110, storage platform 122, and authentication and identity management system 118 are shown in FIG. 1 as individual discrete components. However, each of the compute service manager 108, metadata database 112, execution platform 110, storage platform 122, and authentication and identity management system 118 may be implemented as a distributed system (e.g., distributed across multiple systems/platforms at multiple geographic locations). Additionally, each of the compute service manager 108, metadata database 112, execution platform 110, storage platform 122, and authentication and identity management system 118 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage provider system 104-1. It is desirable to retrieve as much data as possible from caches within the execution platform 110 because the retrieval speed is typically much faster than retrieving data from the cloud storage provider system 104-1.

In embodiments, the compute service manager 108 is also coupled to one or more metadata databases that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enables the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database 112 includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

As shown in FIG. 1, the computing environment 100 separates the execution platform 110 from the storage platform 122. In this arrangement, the processing resources and cache resources in the execution platform 110 operate independently of the data storage devices 124-1 to 124-n in the cloud storage provider system 104-1. Thus, the computing resources and cache resources are not restricted to specific data storage devices 124-1 to 124-n. Instead, all computing resources and all cache resources may retrieve data from, and store data to, any of the data storage resources in the cloud storage provider system 104-1.

Figure 2:
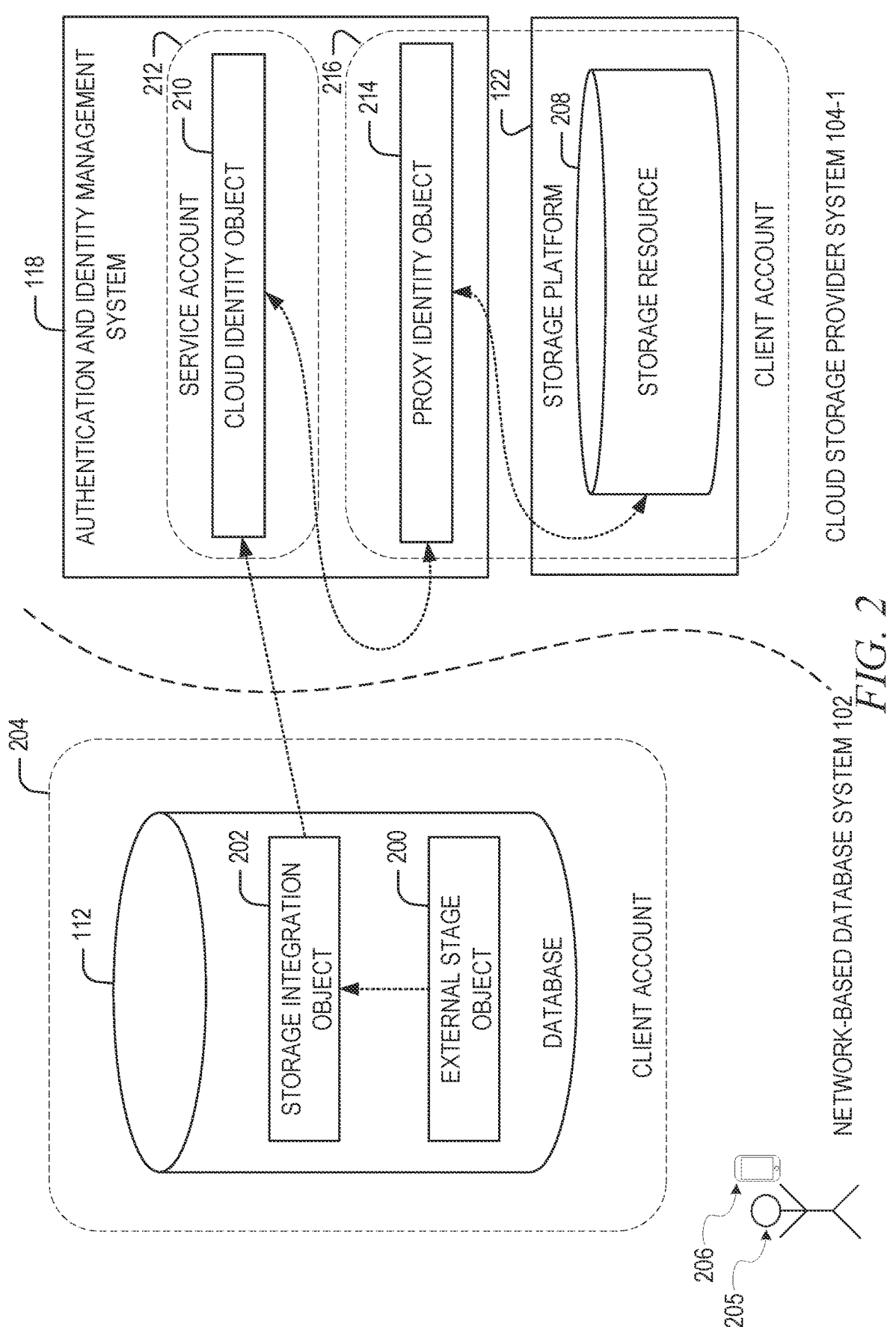
FIG. 2 is a data flow diagram illustrating use of an external credential-less stage object within the computing environment to load or unload data at a storage location within the cloud storage provider system to the network-based database system, in accordance with some embodiments of the present disclosure.

FIG. 2 is a data flow diagram illustrating use of an external stage object 200 within the computing environment 100, in accordance with some embodiments of the present disclosure. The external stage object 200 is an example of the credential-less external stage object(s) 109 illustrated in FIG. 1. The external stage object 200 is generated by the compute service manager 108 and stored in the metadata database 112. The external stage object 200 is generated by the compute service manager 108 within a client account 204. The compute service manager 108 creates the external stage object 200 based on input received from a computing device in communication with the network-based database system 102. For example, a user 205 of the client account 204 can utilize a command line or other user interface provided to a computing device 206 by the network-based database system 102 to provide a command to create the external stage object 200.

The external stage object 200 is a component used to load or unload data at a storage location within the storage platform 122 to the network-based database system 102. In this particular example, the external stage object 200 specifies a storage location corresponding to a storage resource 208 within the storage platform 122 as a location from which data can be loaded or unloaded. The storage resource 208 resides on one or more of the storage devices 124-1 to 124-N of the storage platform 122. The external stage object 200 further comprises a reference (e.g., a pointer) to a storage integration object 202.

The storage integration object 202 is created within the client account 204 by the compute service manager 108 and is stored within the metadata database 112. The compute service manager 108 creates the external stage object 200 based on input received from the computing device 206 of the user 205 of the client account 204 in communication with the network-based database system 102. For example, the user 205 can utilize the command line or other user interface provided to the computing device 206 by the network-based database system 102 to provide a command to create the storage integration object 202.

It shall be appreciated that the user who provides the command to create the external stage object 200 may be a different user from the user that provides the command to create the storage integration object 202. For example, a first user with administrator privileges—an administrative user—may provide the command to create the storage integration object 202 and as part of the command, may grant permission to a second user to use the storage integration object 202 to create external stage objects. In this example, the second user may provide the command to create the external stage object 200.

The storage integration object 202 defines a storage integration between the network-based database system 102 and an externally managed storage location in the storage platform 122. More specifically, the storage integration object 202 describes properties of a storage integration between the network-based database system 102 and the customer managed storage resource 208 (e.g., a folder, data bucket, or other storage resource). The storage integration object 202 comprises an identifier of a storage location corresponding to the storage resource 208 (e.g., a URL) and an identifier of the cloud storage provider system 104-1. In some embodiments, the storage integration object 202 may further specify one or more storage locations to which access to data is to be denied. For example, the external stage object 200 may identify a base storage location to which access is to be allowed using a file path and the storage integration object 202 may further identify a portion of the base storage location to which access is to be allowed or denied with a sub-path of the file path.

Once created, the compute service manager 108 associates the storage integration object 202 with a cloud identity object 210 within a service account 212 maintained by the authentication and identity management system 118 that is associated with the network-based database system 102 and the client account 204. The cloud identity object 210 is an identity within the cloud storage provider system 104-1 associated with the client account 204. The cloud identity object 210 may be created when the client account 204 is created. A unique identifier (e.g., an Amazon Resource Name (ARN)) is associated with the cloud identity object 210 at creation. A storage provider administrator can utilize the authentication and identity management system 118 to grant permission to the cloud identity object 210 to access storage using the identifier of the cloud identity object 210.

The compute service manager 108 may store cloud storage provider identity identifiers in the metadata database 112 in an encrypted format. The compute service manager 108 may further store security credentials associated with each cloud storage provider identity in the metadata database 112 in an encrypted format.

The cloud storage provider system 104-1 generates a proxy identity object 214 within a client account 216 of the cloud storage provider system 104-1. The client account 216 is the account of the client corresponding to the client account 204 within the cloud storage provider system 104-1. The cloud storage provider system 104-1 generates the proxy identity object 214 based on input specified by an administrative user of the client account 216. In some instances, the administrative user of the client account 216 is the user 205.

The proxy identity object 214 defines a proxy identity with an associated trust policy for making services requests within the cloud storage provider system 104-1. More specifically, the proxy identity object 214 includes a set of permissions that allow the cloud identity object 210 to assume the proxy identity to read data from and write data to the storage resource 208. Rather than being uniquely associated with a single person like a user, the proxy identity object 214 defines a proxy identity that can be assumed by multiple users.

In some instances, the proxy identity defined by the proxy identity object 214 does not have long-term security credentials, and in these instances, another identity that is assuming the proxy identity utilizes temporary security credentials provided by the authentication and identity management system 118 to access the proxy identity. Consistent with these embodiments, the temporary security credentials may expire after an expiration time.

The cloud storage provider system 104-1 assigns a unique identifier to the proxy identity object 214 (e.g., an Amazon® Resource Name (ARN)). The unique identifier of the proxy identity object 214 is used by the storage administrator to grant access to storage.

In response to receiving a command to load data from the storage location corresponding to the storage resource 208 to an internally managed storage resource (e.g., a table) or to unload data from the internally managed storage resource to the storage location corresponding to the storage resource 208, the network-based database system 102 uses the external stage object 200 to load or unload the data. In particular, the compute service manager 108 identifies and accesses the storage integration object 202 using the external stage object 200 and uses the storage integration object 202 to access security credentials associated with the cloud identity object 210. The compute service manager 108 uses security credentials associated with the cloud identity object 210 to access security credentials from the authentication and identity management system 118 to allow the cloud identity object 210 to assume the proxy identity defined by the proxy identity object 214 to load or unload data between the internal storage resource and the storage resource 208.

Figure 3:
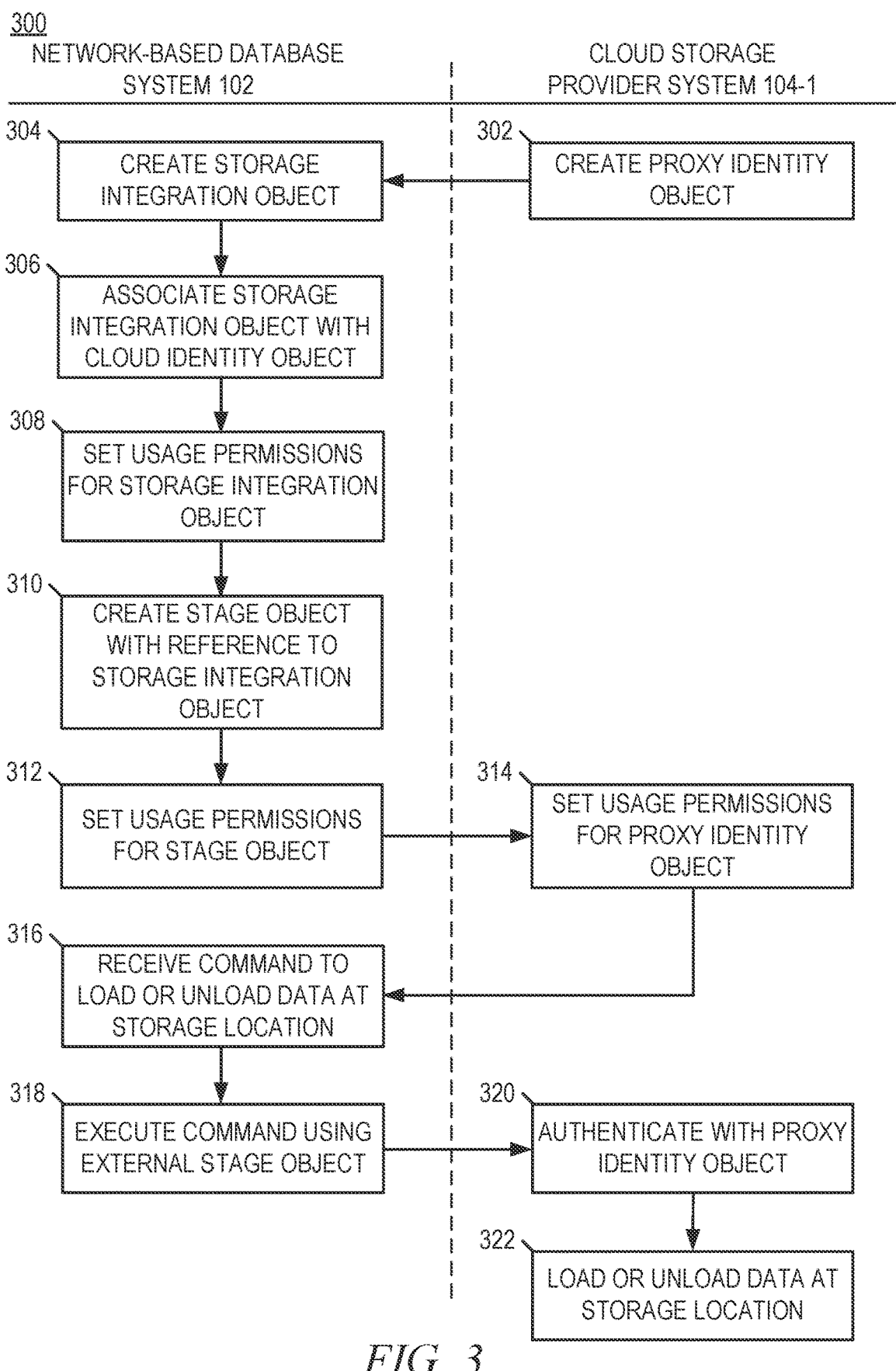
FIG. 3 is an interaction diagram illustrating interactions between components in the computing environment in loading or unloading data at a storage location within the cloud storage provider system to the network-based database system without exchanging security credentials associated with the storage location, in accordance with some embodiments of the present disclosure.

FIG. 3 is an interaction diagram illustrating interactions between the network-based database system 102 and the cloud storage provider system 104-1 in a method 300 for using the external stage object 200 to load or unload data at the storage resource 208 within the cloud storage provider system 104-1 to the network-based database system 102, in accordance with some embodiments of the present disclosure. For ease of explanation, the method 300 is described below with reference to the components illustrated in FIG. 1 and FIG. 2 and described above.

At operation 302, the cloud storage provider system 104-1 creates the proxy identity object 214 within the client account 216. The cloud storage provider system 104-1 generates the proxy identity object 214 based on input specified by an administrative user of the client account 216. As noted above, the proxy identity object 214 includes a set of permissions that allow the cloud identity object 210 to assume the proxy identity to read data from and write data to the storage resource 208.

At operation 304, the compute service manager 108 of the network-based database system 102 creates the storage integration object 202 in the metadata database 112. The compute service manager 108 creates the storage integration object 202 based on a command provided by a first user (e.g., the user 205) of the client account 204. The first user may be an administrative user of the client account 204. As noted above, the storage integration object 202 comprises: an integration name, an identifier of an externally managed storage location such as a URL corresponding to the storage resource 208; an identifier of the cloud storage provider system 104-1; and an identifier of the proxy identity object 214. In some embodiments, the storage integration object 202 may further specify one or more storage locations to which access to data is to be denied. The one or more storage locations to which access to data is to be denied may correspond to portions of the storage locations to which access to the network-based database system 102 is to be provided. For example, the external stage object 200 may identify a base storage location to which access is to be allowed using a file path and the storage integration object 202 may further identify a portion of the base storage location to which access is to be denied with a sub-path of the file path.

At operation 306, the compute service manager 108 associates the storage integration object 202 with the cloud identity object 210. The compute service manager 108 associates the storage integration object 202 with the cloud identity object 210 based on an association between the client account 204 and the cloud identity object 210.

At operation 308, the access management system 111 sets usage permissions for the storage integration object 202. The setting of usage permissions for the integration object may comprise granting a second user permission to use the storage integration object. In some embodiments, the access management system 111 may grant usage permission to an identity that corresponds to multiple users thereby providing usage permission to each user associated with the identity.

At operation 310, the compute service manager 108 creates the external stage object 200. The compute service manager 108 creates the external stage object 200 based on an external stage creation command to load or unload data at a storage location. The storage location may be the same as the storage location specified in the storage integration object 202 or may comprise a portion of the storage location specified in the storage integration object 202. The external stage object 200 comprises an identifier corresponding to the storage location (e.g., the URL corresponding to the storage location) and a reference to the storage integration object 202 (e.g., a pointer).

At operation 312, the access management system 111 sets usage permissions for the external stage object 200. The access management system 111 may set usage permissions based on input received from the second user. The setting of usage permissions for the integration object may comprise granting usage permission to a third identity. The third identity may correspond to a single user or may be associated with multiple users. Once usage permission is granted to the third identity, the one or more users associated with the third identity are allowed to use the external stage object to load or unload data.

At operation 314, a cloud storage provider administrator sets usage permission on the cloud storage provider system 104-1 for the proxy identity object. In setting the usage permissions for the proxy identity object, the cloud storage provider system 104-1 grants permission to the cloud identity object to use the proxy identity object to load and unload data at the storage location.

At operation 316, the compute service manager 108 receives a command to load data from the storage location to an internally managed storage resource (e.g., a table) or to unload data from the internally managed storage resource to the storage location. The command comprises the identifier of the external stage object 200 (e.g., the integration name). The command may be received from a computing device of a third user associated with the third identity. In response to the command, the compute service manager 108 uses the external stage object 200 to execute the command, at operation 318. In executing the command, the network-based database system 102 authenticates with the proxy identity object 214 using security credentials associated with the proxy identity object 214 to assume the proxy identity defined by the proxy identity object 214, at operation 320. The network-based database system 102 assumes the proxy identity object 214 to either load data from the storage location to an internally managed storage resource (e.g., a table) or to unload data from the internally managed storage resource to the storage location, at operation 322.

Figure 4:
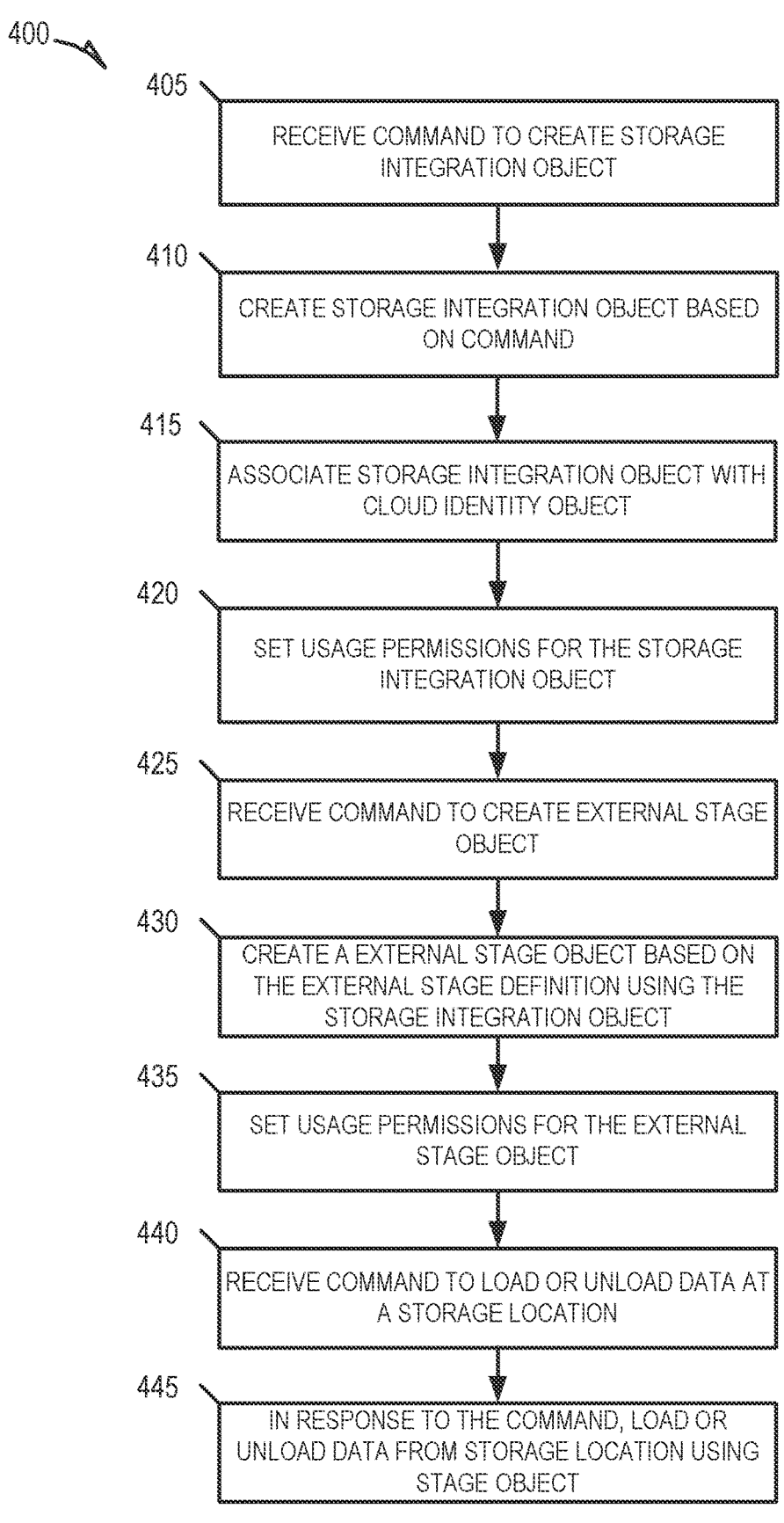
FIGS. 4 and 5 are flow diagrams illustrating operations of the network-based database in performing a method for loading or unloading data from an external storage platform using a credential-less external stage object, in accordance with some embodiments of the present disclosure.
Figure 5:
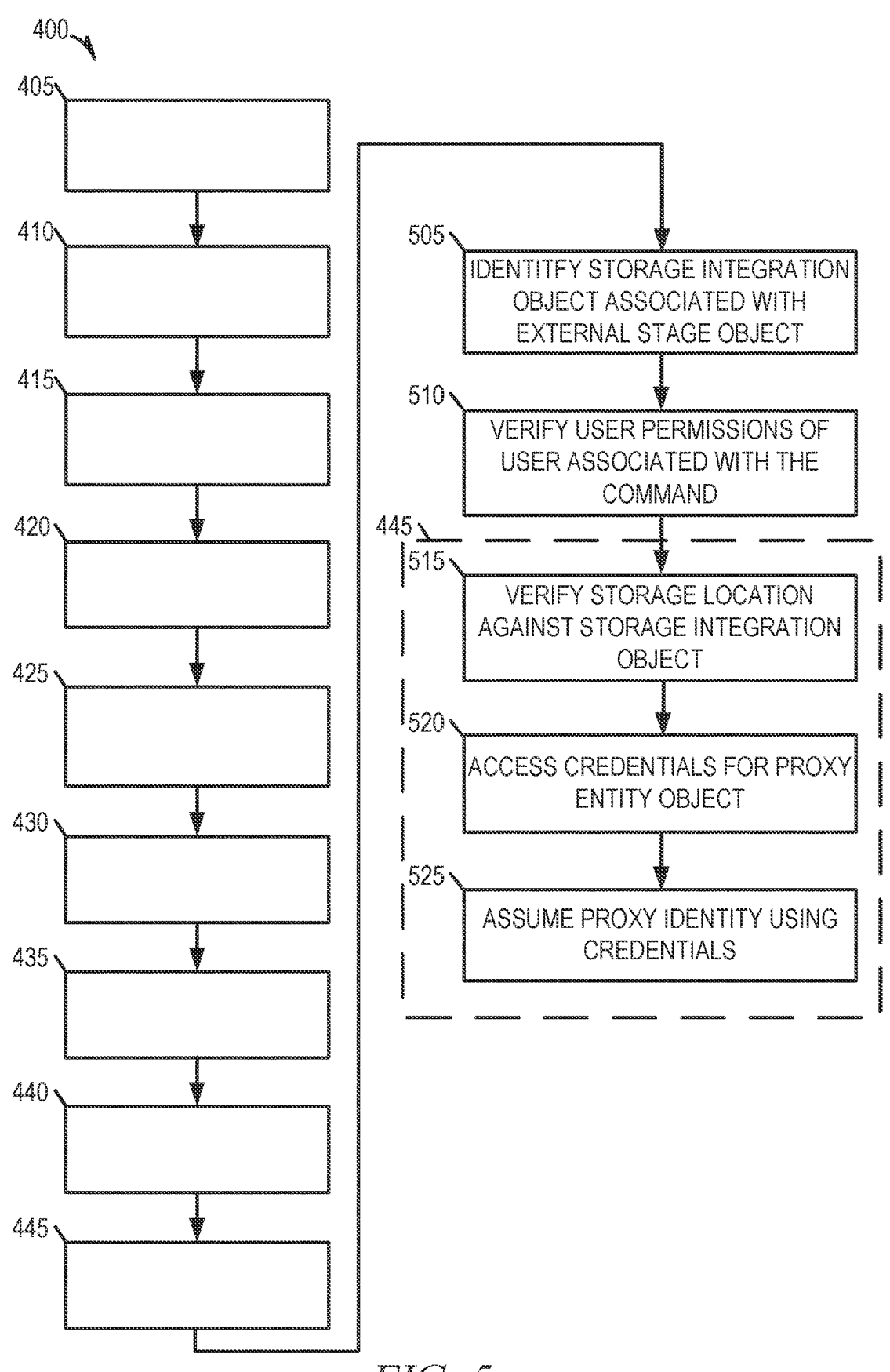

FIGS. 4 and 5 are flow diagrams illustrating operations of the network-based database system 102 in performing a method 400 for loading or unloading data from the storage platform 122 using the external stage object 200, in accordance with some embodiments of the present disclosure. The method 400 may be embodied in computer-readable instructions for execution by one or more hardware components (e.g., one or more processors) such that the operations of the method 400 may be performed by components of network-based database system 102. Accordingly, the method 400 is described below, by way of example with reference thereto. However, it shall be appreciated that the method 400 may be deployed on various other hardware configurations and is not intended to be limited to deployment within the network-based database system 102.

At operation 405, the compute service manager 108 receives a command to create a storage integration object (also referred to as a "storage integration creation command"). The storage integration creation command is received from a computing device in communication with the network-based database system 102 and is specified by a first user via a command line or UI provided to the computing device by the network-based database system 102. The first user is an administrative user belonging to a client account of the network-based database system 102. In general, the command specifies storage locations that are allowed or blocked as part of a storage integration. For example, the command can comprise an identifier corresponding to a first storage location (e.g., a URL) in the storage platform 122 of the cloud storage provider system 104-1 to which the network-based database is to be allowed access to load and unload data. The first storage location corresponds to a data storage resource such as a data folder or a data bucket. The storage integration creation command further specifies the cloud storage provider system 104-1, an integration name, and an identifier of a proxy identity object maintained by the cloud storage provider system 104-1. The proxy identity object defines a proxy identity that has associated permissions to access the first storage location. The proxy identity object further includes permissions that allow a cloud identity to assume the proxy identity to load and unload data at the first storage location.

In some instances, the first storage location may be a base storage location and the storage integration creation command can further specify one or more blocked storage locations to which access by the network-based database system 102 is denied. The blocked locations may correspond to one or more portions of the first storage location. For example, the first storage location may correspond to a storage bucket (e.g., an S3 storage bucket) and the storage integration creation command may specify one or more folders within the storage bucket to which access is to be denied.

At operation 410, the compute service manager 108 creates a storage integration object in the metadata database 112 based on the storage integration creation command. The storage integration object specifies the first storage location (e.g., a URL), the cloud storage provider system 104-1, and the proxy identity object. More specifically, the storage integration object comprises a first identifier corresponding to the first storage location (e.g., a URL), an identifier of the cloud storage provider system 104-1, and an identifier of the proxy identity object (e.g., an ARN). Once created, the network-based database system 102, at operation 415, associates the integration object with a cloud identity object that is associated with the proxy identity object. The cloud identity object defines a cloud identity used to access cloud services provided by the cloud storage provider system 104-1. The cloud identity object is associated with the storage integration object based on an association between the cloud identity object and the client account to which the first user belongs.

At operation 420, the access management system 111 sets usage permissions for the storage integration object. The access management system 111 may set usage permissions based on input received from the first user. The setting of usage permissions for the integration object may comprise granting a second identity permission to use the storage integration object to create one or more external stage objects. In some embodiments, the second identity corresponds to at least a second user. In some embodiments, the access management system 111 may grant usage permission to an identity that corresponds to multiple users thereby providing usage permission to each user associated with the identity.

At operation 425, the compute service manager 108 receives a command to create an external stage object (also referred to as a "external stage creation command"). The external stage creation command is received from a computing device in communication with the network-based database system 102 and is specified by the second user via a command line or UI provided to the computing device by the network-based database system 102. The external stage creation command comprises an identifier of a second storage location (e.g., a URL) and an identifier of the storage integration object (e.g., the name of the storage integration object). In some instances, the second storage location may be the same as the first storage location while in other instances, the second storage location may correspond to a location within the first storage location. That is, the second storage location may correspond to a portion of the first storage location.

At operation 430, the compute service manager 108 creates an external stage object based on the external stage creation command to load or unload data at the second storage location. The external stage object identifies the second storage location and includes an association with the storage integration object. More specifically, the external stage object comprises the identifier of the second storage location (e.g., the URL corresponding to the second storage location) and a reference to the storage integration object (e.g., a pointer).

At operation 435, the access management system 111 sets usage permissions for the external stage object. The access management system 111 may set usage permissions based on input provided by the second user. The setting of usage permissions for the integration object may comprise granting usage permission to a third identity associated with at least a third user. Once usage permission is granted to the third identity, at least the third user is allowed to use the external stage object.

At operation 440, the compute service manager 108 receives a command to unload from an internal data resource (e.g., a table) to a third storage location or to load data from the third storage location to the internal data resource. The command comprises the identifier of the external stage object (e.g., the name given to the external stage object). The command may be received from a computing device of a third user. In response to the command, the compute service manager 108, at operation 445, loads or unloads the data at the third storage location in the storage platform 122 of the external cloud storage provider using the external stage object 200. In a first example, the compute service manager 108 copies data from the storage location to a table maintained in a storage location that is internal to the network-based database system 102. In a second example, the compute service manager 108 copies data from a table maintained in an internal storage location to the storage location specified in the command. The third storage location corresponds to the second storage location. For example, the third storage location may be the same as the second storage location or may correspond to a location within the second storage location.

As shown in FIG. 5, the method 400 may, in some embodiments, further include operations 505, 510, 515, 520, and 525. Consistent with these embodiments, the operations 505 and 510 may be performed subsequent to the operation 440 where compute service manager 108 receives the command to load or unload data at the storage location.

At operation 505, the compute service manager 108 identifies the storage integration object based on an association with the external stage object. For example, as noted above, the external stage object referenced in the command to load or unload data includes a reference to the integration object (e.g., a pointer).

At operation 510, the compute service manager 108 works in conjunction with the access management system 111 to verify user permissions associated with the third user. In verifying the user permissions associated with the third user, the compute service manager 108 verifies the third user has permission to use the external stage object and the storage integration object.

Consistent with these embodiments, the operations 515, 520, and 525 may be performed as part of operation 445 (e.g., as a sub-routine or sub-operations) where the compute service manager 108 loads or unloads data at the storage location.

At operation 515, the compute service manager 108 verifies that the third storage location is allowed by the storage integration object. That is, the compute service manager 108 checks the third storage location against the first storage location identified in the storage integration object to verify that the third storage location is within the first storage location. The service manager 108 may further check the third storage location against any blocked storage locations specified by the storage integration object to determine whether the third storage location is allowed by the storage integration object.

At operation 520, the compute service manager 108 accesses security credentials to be used in authenticating with the cloud storage provider system 104-1 to assume the proxy identity defined by the proxy identity object. In some embodiments, the security credentials are temporary and may expire after a time limit is reached (e.g., 1 hour) and may be limited in scope for use specifically in loading or unloading data at the first storage location.

Consistent with some embodiments, the compute service manager 108 may obtain the security credentials by transmitting a request to the authentication and identity management system 118 of the cloud storage provider system 104-1 for the security credentials. The request can comprise or indicate a first identifier corresponding to the cloud identity object, a second identifier corresponding to proxy identity object, and security credentials associated with the cloud identity object. The security credentials associated with the cloud identity object may be stored in an encrypted format in the metadata database 112. The authentication and identity management system 118 of the cloud storage provider system 104-1 provides the security credentials in response to the request.

At operation 525, the compute service manager 108 causes the cloud identity to assume the proxy identity defined by the proxy identity object using the credentials obtained from the authentication and identity management system 118. That is, the cloud identity interacts with the storage location (e.g., by loading or unloading data) via the proxy identity and may exchange data with the compute service manager 108 using the proxy identity.

As discussed further herein, embodiments of the subject technology provide external volumes to enable tables in different formats including Iceberg tables. Such external volumes store the Iceberg metadata and the file data in Parquet file format (e.g., column-oriented data file format for efficient data storage and retrieval, which provides efficient data compression and encoding schemes) for Iceberg tables, where these volumes exist inside of a user managed storage location. Although Parquet is mentioned, it is appreciated that other file formats can be supported including, for example, Optimized Row Columnar (ORC) or any other appropriate file format different than one utilized for internal storage.

In an implementation, the subject system stores EP metadata, in parallel with a corresponding cloud storage provider system, for Iceberg tables (e.g., in metadata database 112). Moreover, data sharing is provided with Iceberg tables to enable users to share Iceberg tables without copying data. The subject system utilizes indexing techniques to facilitate performance improvements with Iceberg tables.

The following discussion relates to external tables as mentioned above.

The need for external volumes arises from several areas, including:

1. Users that have requested external volume data in buckets they control for reasons including cost and data control.

2. Users that have large sets of data in buckets that they do not or cannot move into in the subject database system for reasons of data control, external tool use, or organizational mandate. Such users want their data to all live in the same place, so new data in the subject database system should be co-located with existing data.

The following discussion relates to creating unified external volumes.

Embodiments of the subject technology combine a user visible external volumes object and the storage integration object so just one volume account level object is created by an administrator. Although this implementation is more complex for the account admin to understand (e.g., because an external volume encapsulates both the storage definition and the integration), this technique facilitates an easier understanding by users because such users only need to understand that an external volume is attached to their table, database, schema, or account.

The following are example code statements for creating an external volume:

```
CREATE OR REPLACE external volume external_volume_ext
STORAGE_LOCATIONS =
(
  (
  NAME = 'region1location'
  STORAGE_URL = 's3://myS3region1bucket/mypath'
  STORAGE_AWS_ROLE_ARN = 'xx'
  )
)
encryption = (TYPE='[NONE|ICEBERGV1]');
```

Storage can be associated with tables as shown in the below code statements:

```
create Iceberg table table1
     EXTERNAL_VOLUME = external_volume_ext;
```

In an implementation, external volume encryption and location properties are unable to be altered, and storage locations can be added and removed. The code statements 'show external volumes' and 'desc external volume' can provide information related to external volumes in an implementation.

When an external volume is created, a nested Integration object is created that is persisted as an IntegrationDPO. The external volume manages the lifetime of the Integration object, which matches the lifetime of the external volume. In an implementation, the nested Integration object is hidden from 'show integrations' commands.

The following are example code statements for creating multi-location external volume integrations:

```
CREATE OR REPLACE external volume exvolume_multi_location
STORAGE_LOCATIONS =
(
  (
  NAME = 'region1location'
  STORAGE_PROVIDER = 'S3'
  STORAGE_BASE_URL = 's3://myS3region1bucket/mypath'
  STORAGE_AWS_ROLE_ARN = 'xx'
  ),
  (
  NAME = 'region2location'
  STORAGE_PROVIDER = 'Azure'
  STORAGE_BASE_URL =
'azure://myazureregion2acct.blob.core.windows.net/mycontainer'
  AZURE_TENANT_ID = 'yy'
  )
)
encryption = (TYPE='[NONE|ICEBERGV1]');
```

In an implementation, a storage location URL, corresponding to a first storage URL for a bucket in a same region as a deployment, is automatically selected and utilized.

When the external volume is created, a search is performed for a storage location, among different locations, that is located in the same region as the deployment. When a particular storage location is found, respective write, read, and delete operations for a file are performed to determine that sufficient privileges are granted to the location. If those operations are successful, the location will be verified, and the verification status will be persisted with the storage location, along with the region. In an example, this information will be shown in a response to executing the 'desc external volume' command. If no verified locations exist for the current region, then write operations cannot be performed on the external volume. When a storage location is used for the first time, it is determined whether a path is empty and does not have pre-existing object(s). When an external volume is dropped, a delete operation is performed to delete all files in the local storage location.

The following code statements are examples of adding and removing storage locations:

```
alter external volume exvolume_multi_location
Add STORAGE_LOCATION =
  (
   NAME = 'region1location'
   STORAGE_PROVIDER = 'S3'
   STORAGE_BASE_URL = 's3://myS3region2bucket/mypath2'
   STORAGE_AWS_ROLE_ARN = 'xx'
  );
alter external volume exvolume_multi_location
remove STORAGE_LOCATION 'region1location';
```

In an example, executing a 'Desc external volume' command results in the following display of the below properties:

Name

Storage Locations, including name (used for removing storage locations), STORAGE_URL, whether the location has been validated, region, and platform-specific info encryption In an example, executing a 'Show external volumes' command results in the following display of the below properties:

Name encryption

Created_on

In an embodiment, external volumes do not show in executing a 'show volumes' command.

The in-region storage locations are found and validated at table creation time, and checked for validation when performing a write operation to the table. There must be a valid, in-region location; otherwise an error is produced.

A 'desc iceberg table' command, when executed, displays the name of the associated external volume, using a look-up on data persistence objects (DPOs) referred to as VolumeDPOs.

When the Iceberg table is created, the value of the EXTERNAL_VOLUME parameter is evaluated, the Volume object found, and its ID is persisted in the TableDPO (e.g., table data persistence object).

In an embodiment, changing the EXTERNAL_VOLUME parameter values for an existing database/schema is supported, but apply to new tables created after the value is changed.

In an embodiment, dropping (e.g., removing) an external volume object displays an error message if there are still active DB objects that reference the external volume, including dropped tables that are still in retention. To implement this, a slice of tables that reference the volume are kept.

The below properties are new additions to the VolumeDPO:

```
int encryptionType;
// nested integration object
Boolean isExternal;
```

In an implementation, a 'show iceberg tables' command add the boolean field isIceberg.

The following discussion relates to various rules and system behavior for Iceberg tables.

Iceberg tables represent a new "type" of table. In embodiments, such tables are created with the modifier "Iceberg". Other types of tables include transient, temporary, external, among other table types. In an implementation, to create an Iceberg table, the following command is utilized:

```
create iceberg table table1
    EXTERNAL_VOLUME = myexternalVolume;
```

The following are additional rules of Iceberg tables:

Iceberg tables have an external volume defined at creation time. It can be defined on the table, schema, database, or account, but USAGE must be granted at table creation time and whenever the table is accessed. If an external volume is not found or not defined, the creation fails with a helpful error message. Once created, the associated external volume on a table is unable to be changed. (It can be changed on the schema, database, or account but will apply only to new tables created.)

Transient and temporary Iceberg tables are not permitted in an implementation. In another implementation, if users request failsafe Iceberg tables, volumes created with specific failsafe properties are provided, and normal and transient volume properties are set (e.g., by user(s)).

External volumes are unable to be dropped or removed if a table is using them. In an implementation, tables are identified that use the volume and an error is generated if any are found.

The following is a discussion of various rules and system behavior for external volumes.

In an implementation, the external volume user model and API has some similarities to the stage and storage integration discussed before, but represent a unified single object.

Property names for encryption are the same as those used for stages.

Property names for storage locations are similar to those used by storage integrations. In an implementation, a nested object ExternalStageIntegration is generated to store properties relevant to the storage integration.

Usage privileges are created on external volumes.

Direct credentials are not permitted on external volumes.

The following discussion relates various system operations for external volumes and tables.

The VolumeDPO is persisted so that the volumeId can be persisted in EP files (e.g., metadata) and referenced later.

The volume object is passed in the execution plan to an execution node.

Tables are responsible for including the persisted volume id in their volume list in the SDL. Tables identify the Iceberg volume in the SDL so that an execution node can identify where it should write out Iceberg data and metadata files. A compute service manager uses the volume object to write Iceberg metadata files.

An execution node creates volume objects for the Iceberg volumes, then uses them when Iceberg data is written.

The following discussion relates to replication of external volume data.

In an implementation, table data in external volumes is replicated as table data. To enable replicating table data for any table stored on an external volume, replication is configured for the table/schema/database, and table data is replicated using various replication mechanisms.

In an implementation, external volume object metadata is replicated so that all regions contain a given external volume object. As discussed before, an external volume can be declared for multiple region support with multiple locations.

In a given storage platform (e.g., Amazon S3), the subject system creates master and child volumes. In an implementation, a master volume is created at the base location, and contains EP and BEP files. Child volumes are created as prefixes under the master volume and contain data files. Moreover, in external volumes, data files are dropped to the external volume location, or a sub-path determined by the Iceberg table implementation.

An illustration for the normal volume for an Iceberg table:

```
<normal volume path>
    ● EP/BEP files
    ● MD and MN metadata files
```

An illustration for the external volume my Multilocation Volume above for Amazon S3:

```
s3://myS3region1bucket/my_normal_path1
    ● Iceberg metadata files (snapshot, manifest, manifest list)
    ● Parquet files
```

The following discussion relates to metadata included in a given Iceberg table. In an implantation, table information is stored across a number of files. Such metadata for a given Iceberg table includes the following:

Metadata file—The state of a table at some point in time, including the set of all data files e.g., a table version.

Manifest list—A file that lists manifest files; one per snapshot.

Manifest—A file that lists data or delete files; a subset of a snapshot.

Data file—A file that contains rows of a table.

Delete file—A file that encodes rows of a table that are deleted by position or data values.

To enable interoperability between Iceberg tables and external tools, the subject system provides a metadata API based at least in part on an Iceberg Metadata REST specification. In an implementation, the metadata API exposes information about Iceberg tables and facilitates security and authentication against Iceberg tables.

Figure 6:
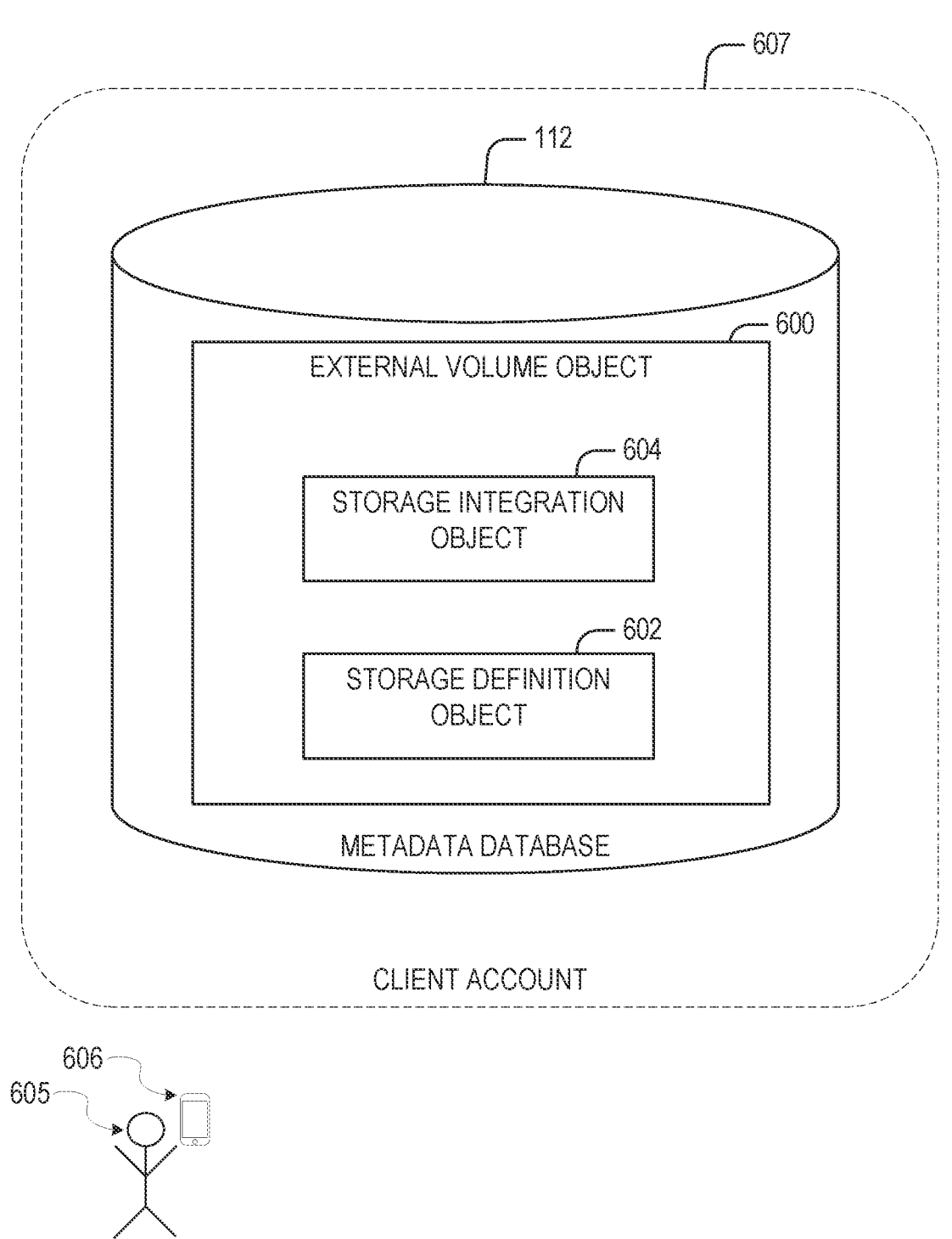
FIG. 6 is a diagram illustrating an external volume object within the network-based database system, in accordance with some embodiments of the present disclosure.

FIG. 6 is a data flow diagram illustrating use of an external volume object 600 within the computing environment 100, in accordance with some embodiments of the present disclosure. The external volume object 600 is an example of the external volume object(s) 107 illustrated in FIG. 1. The external volume object 600 is generated by the compute service manager 108 and stored in the metadata database 112. The external volume object 600 is generated by the compute service manager 108 within a client account 607. The compute service manager 108 creates the external volume object 600 based on input received from a computing device in communication with the network-based database system 102. For example, a user 605 of the client account 607 can utilize a command line or other user interface provided to a computing device 606 by the network-based database system 102 to provide a command to create the external volume object 600. The external volume object 600 includes a storage definition object 602 and also encapsulates (e.g., includes) a storage integration object 604. In an implementation, as part of creating the external volume object, the storage definition object 602 and storage integration object 604 are created within the client account 607 by the compute service manager 108 and is stored within the metadata database 112.

In an implementation, the storage definition object 602 is a component used to load or unload data at a storage location within the storage platform 122 to the network-based database system 102. In this particular example, the storage definition object 602 specifies a storage location corresponding to a storage resource within the storage platform 122 as a location from which data can be loaded or unloaded. The storage resource resides on one or more of the storage devices 124-1 to 124-N of the storage platform 122.

The storage integration object 604 defines a storage integration between the network-based database system 102 and an externally managed storage location in the storage platform 122. More specifically, the storage integration object 604 describes properties of a storage integration between the network-based database system 102 and the customer managed storage resource (e.g., a folder, data bucket, or other storage resource). The storage integration object 604 includes an identifier of a storage location corresponding to the storage resource (e.g., a URL) and an identifier of the cloud storage provider system 104-1. In some embodiments, the storage integration object 604 may further specify one or more storage locations to which access to data is to be denied. For example, the external volume object 600 may identify a base storage location to which access is to be allowed using a file path and the storage integration object 604 may further identify a portion of the base storage location to which access is to be allowed or denied with a sub-path of the file path.

Figure 7:
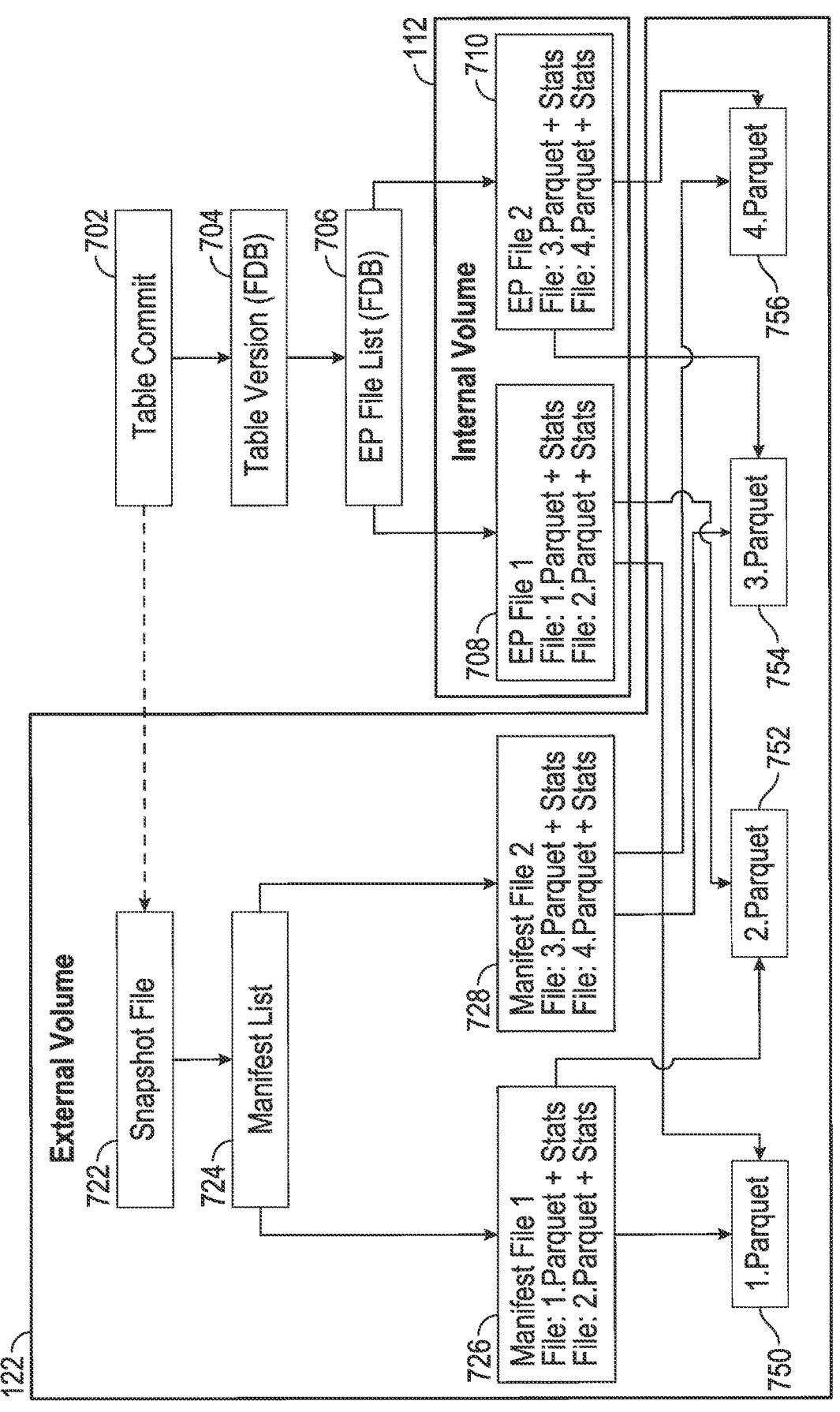
FIG. 7 illustrates an example of a processing flow and example structure for storing data in an external volume and an internal volume, in accordance with embodiments of the subject technology.

FIG. 7 illustrates an example of a processing flow and example structure for storing data in an external volume and an internal volume, in accordance with embodiments of the subject technology. In an implementation, the operations described in FIG. 7 can be performed by components of the network-based database system 102 (e.g., compute service manager 108, a particular execution node such as one described in FIG. 11), and involving a metadata database (e.g., metadata database 112) and a particular storage platform provided by a cloud storage provider system (e.g., storage platform 122 on cloud storage provider system 104-1).

As shown, compute service manager 108 receives a command 702 to commit a table (e.g., as part of a transaction performing a set of statements on the table such as updating or modifying data in the table).

The compute service manager 108 creates a table version 704 corresponding to a snapshot of a new version of the table that is to be committed. In an implementation, table version 704 is stored in internal storage (e.g., metadata database 112) that can be referred to as an "internal volume" for the purposes of discussion and to distinguish against an external volume shown in FIG. 7. An internal volume as shown can store and process metadata in a different manner (s) than metadata stored and processed on an external volume. In an example, a snapshot is an up-to-date representation of data in the table at a point in time. In particular, a snapshot includes a list of data files that make up the table's contents at the time of the snapshot. In an example, data files are stored across multiple manifest files, and the manifest files for a snapshot are listed in a single manifest list.

The compute service manager 108 creates an EP file list 706 corresponding to a set of EP metadata files, which is stored on internal storage (e.g., metadata database 112) in an implementation.

The compute service manager 108 creates a set of EP files including EP file 708 and EP file 710 based on the EP file list 706, which is stored on internal storage (e.g., metadata database 112) in an implementation. In an implementation, EP file list 706 can be an EP file data persistence object. As shown, each EP file can include information indicating a set of data files stored in a different format (e.g., Parquet) and associated statistics of each data file in an external volume. As further shown, each EP file includes a reference (e.g., pointer) to a data file stored on the external volume where the data file is in a different file format (e.g., Parquet) than utilized for internal storage. Although Parquet is utilized in examples herein, it is appreciated that the set of data files can be stored in another format such as Avro, or ORC (Optimized Row Columnar).

Turning now to the external volume on storage platform 122, the compute service manager 108 creates a snapshot file 722 in response to the command 702 to commit the table. In an embodiment, snapshot file 722 is based on the Iceberg table format that is different from the table format used for table version 704 in internal storage. In an embodiment, compute service manager 108 can perform the processing flow on the right side of FIG. 7 involving internal storage, and then perform the processing flow on the left side of FIG. 7. In another embodiment, compute service manager 108 performs the respective processing flows in parallel.

The compute service manager 108 creates a manifest list 724 which is a list of metadata files stored in accordance with the Iceberg table format. In an implementation, information related to a path for each metadata file and associated statistics (e.g., partition statistics, data file counts, and the like) are also included in manifest list 724.

In an embodiment, a manifest list is a list of manifest files for a snapshot of a given (Iceberg) table. A new manifest list is written for each attempt to commit a snapshot of the table in an example. Further, the manifest list includes metadata that can be utilized to avoid scanning all of the manifest files of a snapshot when planning a table scan. For example, such metadata includes a number of added, existing, and deleted files. More specifically, examples of metadata included in a manifest list are the following:

Location of the manifest file.

Length of the manifest file in bytes

The type of files tracked by the manifest file

The sequence number when the manifest files was added to the table

The minimum data sequence number of all live data or delete files in the manifest file ID of the snapshot where the manifest file was added Number of entries in the manifest file that have status ADDED Number of entries in the manifest file that have status EXISTING Number of entries in the manifest file that have status DELETED Number of rows in all of files in the manifest file that have status ADDED Number of rows in all of files in the manifest file that have status EXISTING Number of rows in all of files in the manifest file that have status DELETED Implementation-specific key metadata for encryption In an implementation, a manifest file is a metadata file that lists a subset of data files that make up a snapshot. In an implementation, information for each data file in a manifest file includes information such as column-level statistics, and summary information that can be utilized for pruning during query plan compilation. More specifically, examples of metadata included in a manifest file can include the following:

JSON representation of the table schema at the time the manifest file was written.

ID of the schema used to write the manifest file as a string

Table format version number of the manifest file as a string

Type of content files tracked by the manifest file: "data" or "deletes"

Type of content stored by the data file

File path

File format

Used to track additions and deletions.

Snapshot id where the file was added, or deleted

Data sequence number of the file

File sequence number indicating when the file was added

File path, and metrics for a data file as discussed further below

The compute service manager 108 creates a set of metadata files in the Iceberg table format including, in this example, manifest file 726 and manifest file 728. As shown, each manifest file includes information indicating a set of data files stored in a particular format (e.g., Parquet) and associated statistics or metrics of each data file in the external volume on storage platform 122. As further shown, each manifest file includes a reference (e.g., pointer) to a data file stored on the external volume. In an implementation, a given manifest file includes a list of paths corresponding to the set of data files. In addition, information related to a data file is also included in the manifest file, which can include column-level metrics such as upper and lower bounds of values from each column that can be utilized for pruning files during query compilation.

In an implementation, a manifest file is an immutable file (e.g., in Avro format, and the like) that lists data files or delete files, along with metrics, and tracking information. A set of manifest files is utilized to store a snapshot, which tracks all of the files in a table at some point in time. Manifest files are tracked by a manifest list for each snapshot of a table.

As further shown, the example of FIG. 7 includes a set of data files, including data file 750, data file 752, data file 754, and data file 756, each of which are in the different file format (e.g., Parquet) and are both referenced by the aforementioned manifest files on the external volume and the EP files on internal storage discussed above.

In an implementation, examples of metadata included in a data file can include the following:

Type of content stored by the data file: data, equality deletes, or position deletes.

Full URI for the file

String file format name, Avro, ORC or Parquet

Number of records in this file

Total file size in bytes

Map from column id to the total size on disk of all regions that store the column Map from column id to number of values in the column (including null and NaN values)

Map from column id to number of null values in the column

Map from column id to number of NaN values in the column

Map from column id to number of distinct values in the column; distinct counts must be derived using values in the file by counting or using sketches, but not using methods like merging existing distinct counts Map from column id to lower bound in the column serialized as binary Map from column id to upper bound in the column serialized as binary Implementation-specific key metadata for encryption.

Split offsets for the data file. For example, all row group offsets in a Parquet file.

Field ids used to determine row equality in equality delete files.

ID representing sort order for this file

In an implementation, data files (e.g., data file 750, data file 752, data file 754, and data file 756) are referenced in a manifest file.

As mentioned before, although the above discussion relates to Iceberg tables, it is appreciated that the subject system is enabled to support any appropriate table format (e.g., Apache Hive ACID, Apache Hudi, and the like) that is different than a table format utilized for internal storage (e.g., metadata database 112). Moreover, the subject system is enabled to support any appropriate file format in addition to the aforementioned Apache Parquet file format (e.g., CSV, XML, ORC, Avro, JSON, and the like).

The following discussion relates to management of metadata for Iceberg tables to enable querying by external tool(s).

Embodiments of the subject technology can persist data in the Iceberg table format to enable querying such data by external tools. In particular, the below discussion describes how to generate and manage table metadata in Iceberg format so that external tools can query data written by network-based database system 102.

In this context, it is useful to understand how external tools support reading and writing Iceberg tables. The Iceberg table format defines a specification for the table metadata. In an implementation, the table metadata is stored as files on blob storage (e.g., provided by storage platform 122). The metadata files are cataloged in an Iceberg catalog (e.g., stored in a database such as metadata database 112).

In an implementation, Iceberg tables involve data files, metadata files, and a catalog. An Iceberg SDK is provided to access the tables in which the SDK has a pluggable interface for catalogs as discussed in FIG. 8 below.

Figure 8:
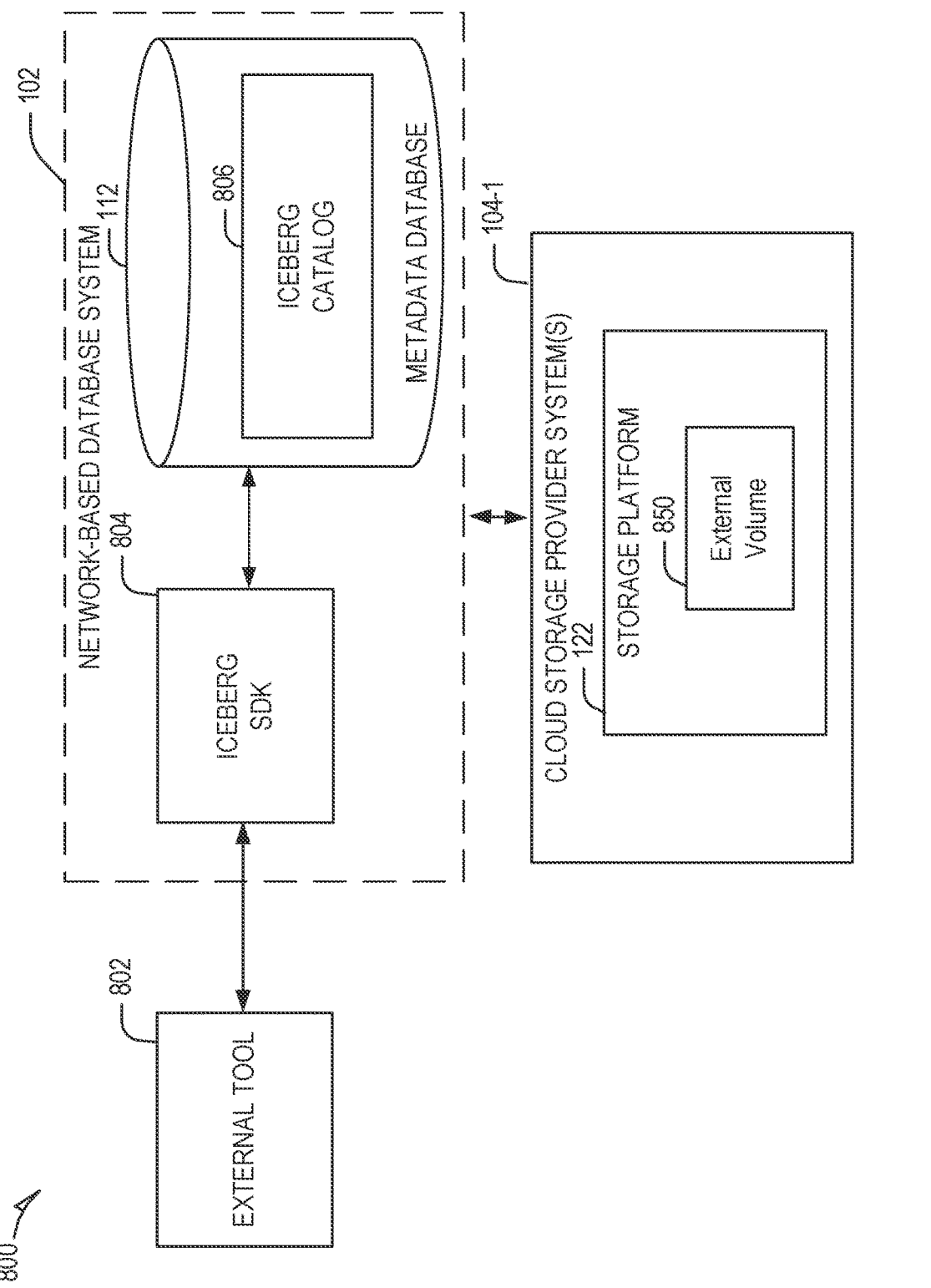
FIG. 8 illustrates an example computing environment enabling an external tool to communicate with the network-based database system for accessing an external volume (e.g., Iceberg tables), in accordance with some embodiments of the present disclosure.

FIG. 8 illustrates an example computing environment 800 enabling an external tool 802 to communicate with the network-based database system 102 for accessing an external volume 850 (e.g., Iceberg tables), in accordance with some embodiments of the present disclosure.

As shown, computing environment 800 includes external tool 802, Iceberg SDK 804, Iceberg catalog 806, and external volume 850. In an embodiment, network-based database system 102 includes Iceberg SDK 804 which provides access to Iceberg catalog 806 stored in metadata database 112 and external volume 850 stored on storage platform 122 provided by cloud storage provider system 104-1.

In the example of FIG. 8, external tool 802 corresponds to an external query engine such as an Apache Spark instance. However, it is appreciated that other external tools (e.g., Trino, Hive, Presto, a distributed query engine, and the like) can be provided to interoperate with Iceberg SDK 804 and external volume 850.

In an example, when external tool 802 receives a query for an Iceberg table, the tool can perform the following:

The query identifies which catalog (e.g., Iceberg catalog 806) the table is in. This catalog is registered in the Iceberg SDK 804. The Iceberg SDK 804 queries the specified catalog to identify the location of the requested snapshot (default latest) of the table.

The SDK will read the snapshot metadata files and generate the table metadata. This includes the schema of the table and (effectively) the file names of all the data files for the query.

This information is handed over to the query engine (e.g., Spark or Trino), which will then read the data files and complete the query.

To enable external tools to query the Iceberg tables created by network-based database system 102, Iceberg SDK 804 provides a metadata API to discover the Iceberg tables using a catalog (e.g., Iceberg catalog 806) registered in Iceberg SDK 804, and an endpoint to query the catalog.

As discussed before, for creating an Iceberg table, an external volume (e.g., external volume 850) is utilized, and an Iceberg table is created using the external volume. Different files of different formats (e.g., Parquet data files and Iceberg metadata files) for this Iceberg table are stored in the external volume. Write and read operations on Iceberg tables are provided using network-based database system 102 in an embodiment.

In an example, an approach to access the table metadata includes writing equivalent Iceberg metadata files (e.g., stored in metadata database 112) and accessing such metadata using the Iceberg SDK 804.

In an embodiment, the following illustrates analogous data stored on an external volume with respect to data stored by network-based database system 102.

| External Volume | Network-Based Database System 102 |
|---|---|
| Manifest File | EP file |
| Manifest List | EPFileDPO |
| Snapshot ID | Table Version |
| Metadata file | TableDPO |
| | ColumnDPO |
| | Table VersionDPO |
| List of Snapshot IDs | EP File Version |

For a given Iceberg table, metadata for the table is stored as a JSON file (e.g., metadata file) on the external volume. In an example, each metadata change creates a new metadata file. The table metadata includes information such as table UUID, column IDs, schema, details of each snapshot (and name of manifest list for the snapshot), snapshot log, metadata log, and the like. A new metadata file is created for each new snapshot and DDL operation. However, some DDL operations, such as add column, do not create a new snapshot ID but create a new metadata file.

In an implementation, for performing queries on an Iceberg table stored on an external volume, EP file(s) are generated such that network-based database system 102 can forgo reading the Iceberg metadata files on the external volume for query processing.

The following are examples of a DDL or DML operation performed by network-based database system 102 and a corresponding operation performed in conjunction on an Iceberg table stored on an external volume.

| DDL Operation | Iceberg Metadata Operation |
|---|---|
| Create iceberg table | Generate the metadata file |
| Create iceberg table as select | Generate the manifest file(s) and manifest list. Generate the metadata file with a reference to the manifest list |
| Alter iceberg table rename to <new table name> | N/A |
| Alter iceberg table swap with <target table name> | Same as rename table, nothing to do with manifest files. |
| Alter iceberg table set <table properties> | Do nothing in Iceberg manifest files. These are network-based database system 102 table properties. |
| Alter iceberg table add column | Generate new metadata file with the new schema containing the added column. |
| Alter iceberg table rename column | Generate new metadata file with the new schema containing the added column and updated metadata log. |
| Alter iceberg table alter column | Generate new metadata file with the new schema containing the updated column and updated metadata log. |
| Clone | Generate new metadata file and new manifest list |
| Drop iceberg table | Deletes the data and metadata files for the table |

| DML Operation | Iceberg Operation |
|---|---|
| Insert | Generate a new manifest file, manifest list Generate a new metadata file, pointing to the manifest list. |
| Update | Same as insert |
| Merge | Same as insert |
| Delete | Same as insert |
| Truncate | Same as insert |

The following discussion relates to various data persistence objects utilized by network-based database system 102 for managing and tracking Iceberg metadata.

In an embodiment, an FDB table ExternalMetadataFileDPO is utilized to store the location of Iceberg metadata file, and this table includes one row for each new metadata file that is created. The following is an example table schema:

| ACCOUNT_ID | (network-based database system 102 account ID) |
|---|---|
| TABLE_ID | (network-based database system 102 table ID) |
| DML_START_TIME | (Iceberg snapshot ID) // this is the table version |
| VERSION_STAMP | (unique monotonically increasing number for each DDL, set to 0 for DML) |

-continued

| LAST_EXPIRED_EPFV | (0 if the DPO was not created due to snapshot expiry) |
| METADATA_LOCATION | (full path of the metadata file relative to the data volume) |

In an embodiment, a DPO of type ExternalManifest-FileDPO is utilized to track EP file to manifest file mapping. In an example, the schema is the following:

```
key=(accountId,tableId,epFileVersion,epFileId),
       value=(manifest file location)
```

Each DPO record serves the purpose of mapping between manifest file and EP file, which can be needed for creating Iceberg metadata.

In an implementation, a metadata file for an Iceberg table includes the following fields:

Table UUID is randomly generated.

SNAPSHOT ID is set to DML_START_TIME (e.g., Table Version)

generated column ordinal is used as column IDs in the schema (this becomes the field ID in the Parquet file).

The following discussion relates to creating Iceberg metadata by network-based database system 102.

In an embodiment, two approaches are utilized to trigger Iceberg metadata generation:

1. During compaction of the Iceberg table
2. On-demand by an external client (e.g., when a metadata file for a table version that has yet to be generated is requested)

In an example, manifest files are generated based on EP files, and a mapping from an EP file to a manifest file is maintained (e.g., created) in an EpFileDPO (e.g., EP file data persistence object). The manifest file, which is pointed to by the EP file, corresponds to the particular manifest file containing the active data files registered in the EP file. In an example, a set of manifest files is tracked for updating when a delete operation is performed.

The following discussion relates to an example approach for updating an external table's EP files for a snapshot.

When creating or updating an Iceberg external table, the provided metadata, manifest-list, and manifest files are parsed to generate new EP files. For each snapshot that is processed, the following can be performed:

(1) Parse the metadata JSON file to identify the schema and manifest-list associated with the specified snapshot ID.

(2) Create/delete the table's columns to reflect schema changes for the specified snapshot ID.

(3) Parse the snapshot's manifest list AVRO file to process individual manifest files.

i. When parsing the manifest-list file for "create external table", the manifest files in the list with 'added_files_count'>0 and 'existing_files_count'>0 are processed.

ii. When parsing the manifest-list file for "refresh snapshot", manifest files might be shared across manifest-list files and therefore already processed by an earlier snapshot, which can be leveraged to streamline the processing.

iii. If a manifest file's 'added_snapshot_id' corresponds to the snapshot ID that is being processed, then the file is processed.

iv. Otherwise, the manifest file can be skipped for processing. In this case, the manifest file should already have been processed earlier.

(4) Parse each manifest AVRO file from (3). For each 'manifest_entry' in the file:

i. Check the 'status' of the file: ADDED, EXISTING, DELETED.

ii. When parsing manifest files for "create external tables", only process ADDED and EXISTING manifest entries.

iii. When parsing manifest files for "refresh snapshot", only process ADDED and DELETED manifest entries.

iv. For ADDED/EXISTING manifest entries, read the 'data_file' struct and create an EP File RegistrationRequest for the 'file_path'. For fieldIds associated with columns in the snapshot's schema, add statistics (value_counts, 'null_value_counts', 'nan_value_counts', 'distinct_counts', 'lower_bounds', processing of 'upper_bounds') to the RegistrationRequest.

v. EPs for strings are truncated to a fixed length.

vi. Although external tables traditionally populate the RegistrationRequest with file metadata such as Last-Modified/ETags/MD5, this information can be omitted for Iceberg external tables, and it can be assumed that all metadata and data files are immutable.

vii. Iceberg uses parquetFieldId when referencing columns. When creating the RegistrationRequest, parquetFieldId can be utilized.

viii. For DELETED manifest entries, read the 'data_file' struct and create an EP File UnRegistrationRequest for the 'file_path'.

ix. RegistrationRequest and UnRegistrationRequests are batched for processing.

In an example, columns are added or removed with the "refresh snapshot" command and the original "create table" command. These columns represent the schema of the Iceberg table associated with the most recent "refresh snapshot" command. In other words, there will be one column per field.

In the above example, the Iceberg table has REGIONKEY as field 1 and NAME as field 2. In an example, VALUE does not show up when query statement "select*" is expanded.

Figure 9:
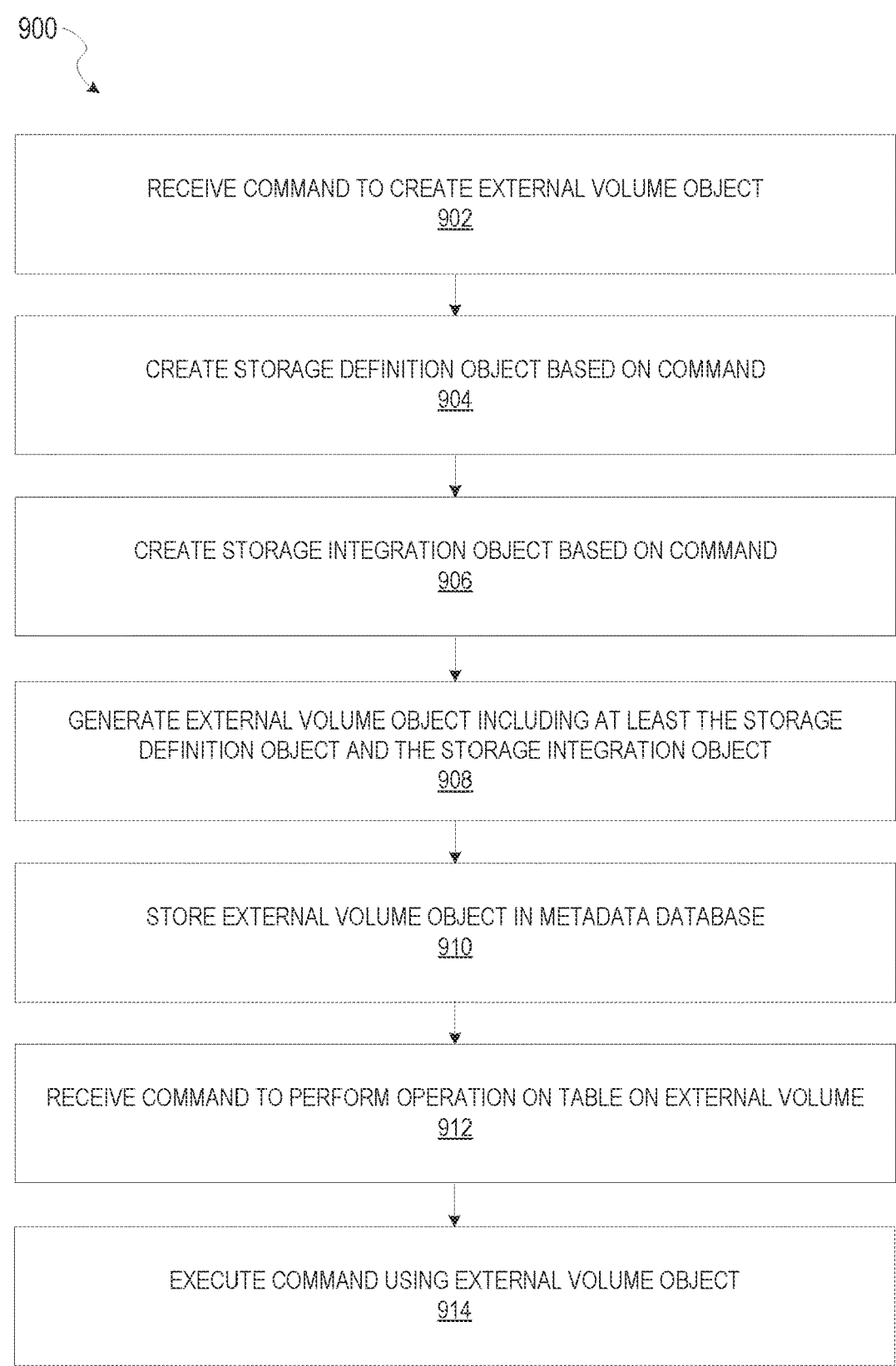
FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102, such as components of the compute service manager 108 or a node in the execution platform 110. Accordingly, the method 900 is described below, by way of example with reference thereto. However, it shall be appreciated that the method 900 may be deployed on various other hardware configurations and is not intended to be limited to deployment within the network-based database system 102.

At operation 902, the compute service manager 108 receives a command to create an external volume object.

At operation 904, the compute service manager 108 creates a storage definition object based on the command.

At operation 906, the compute service manager 108 creates a storage integration object based on the command.

At operation 908, the compute service manager 108 generates the external volume object including at least the storage definition object and the storage integration object.

In an embodiment, the compute service manager 108 can create the storage integration object and then the external volume object. Moreover, this can be performed inline (e.g., in the transaction) or beforehand.

At operation 910, the compute service manager 108 stores the external volume object in a metadata database (e.g., metadata database 112).

At operation 912, the compute service manager 108 receives a command to perform an operation on a table on an external volume.

At operation 914, the compute service manager 108 executes the command on the table using the external volume object.

FIG. 10 is a flow diagram illustrating operations of a database system in performing a method, in accordance with some embodiments of the present disclosure. The method 1000 may be embodied in computer-readable instructions for execution by one or more hardware components (e.g., one or more processors) such that the operations of the method 1000 may be performed by components of network-based database system 102, such as components of the compute service manager 108 or a node in the execution platform 110. Accordingly, the method 1000 is described below, by way of example with reference thereto. However, it shall be appreciated that the method 1000 may be deployed on various other hardware configurations and is not intended to be limited to deployment within the network-based database system 102.

At operation 1002, the compute service manager 108 receives a command to commit a table in a different table format on an external volume, the external volume provided by a storage platform of a cloud storage provider system.

At operation 1004, the compute service manager 108 generates a first snapshot of the table on internal storage. In an embodiment, generating the first snapshot of the table on internal storage comprises incrementing a snapshot identifier associated with the table on the external volume.

At operation 1006, the compute service manager 108 generates a first list of metadata files on the internal storage.

At operation 1008, the compute service manager 108 generates, based on the first list of metadata files, a first set of metadata files on the internal storage.

At operation 1010, the compute service manager 108 generates a second snapshot of the table on the external volume.

At operation 1012, the compute service manager 108 generates a second list of metadata files on the external volume.

At operation 1014, the compute service manager 108 generates, based on the second list of metadata files, a second set of metadata files on the external volume.

At operation 1016, the compute service manager 108 generates a first set of data files in a different file format on the external volume.

In an embodiment, the compute service manager 108 can generate the first set of data files in the different file format after operation 1004, or more specifically after operation 1008.

At operation 1018, the compute service manager 108 sends an indication that the command to commit the table has completed.

In an embodiment, the first snapshot of the table on internal storage comprises a table version, the first list of metadata files on the internal storage comprises a set of expression property (EP) file list, and the first set of metadata files on the internal storage comprises a set of EP files.

In an embodiment, the second snapshot of the table on the external volume comprises a snapshot file, the second list of metadata files on the external volume comprises a manifest list, the second set of metadata files on the external volume comprises a set of manifest files, and the different file format comprises a Parquet file.

In an embodiment, the table on the external volume comprises a first table in an Iceberg format, the first table in the Iceberg format comprising a snapshot file, manifest list, a set of manifest files, and a set of data files.

The following discussion relates to importing a table in accordance with embodiments of the subject technology. Although the above discussion in FIG. 10 relates to creating a table, the subject system is enabled to import a table(s), too.

In an implementation, the compute service manager 108 is enabled to import data to be stored in a different table format (e.g., Iceberg) on a given external volume. When importing the table in the different format (e.g., Iceberg table), metadata file(s) are rewritten, and any data files in a different format (e.g., Parquet data file) will not be read or written.

In an embodiment, the compute service manager 108 can import the table from an existing snapshot or a log record including information related to a list of changes (e.g., deltas).

In an embodiment, the compute service manager 108 can import raw data files (e.g., Parquet data files) as a managed table.

FIG. 11 is a flow diagram illustrating operations of a database system in performing a method, in accordance with some embodiments of the present disclosure. The method 1100 may be embodied in computer-readable instructions for execution by one or more hardware components (e.g., one or more processors) such that the operations of the method 1100 may be performed by components of network-based database system 102, such as components of the compute service manager 108 or a node in the execution platform 110. Accordingly, the method 1100 is described below, by way of example with reference thereto. However, it shall be appreciated that the method 1100 may be deployed on various other hardware configurations and is not intended to be limited to deployment within the network-based database system 102.

At operation 1102, the compute service manager 108 receives a query to perform an operation on a particular table stored on the external volume.

At operation 1104, the compute service manager 108 determines a snapshot identifier of the particular table based on the query.

At operation 1106, the compute service manager 108 determines a table version on internal storage based at least in part on the snapshot identifier.

At operation 1108, the compute service manager 108 determines, using the set of EP files, a set of data files stored on the external volume.

At operation 1110, the compute service manager 108 determines, using an expression property (EP) file data persistence object, a set of EP files stored on the internal storage based at least in part on the table version.

At operation 1112, the compute service manager 108 performs the query on the set of data files stored on the external volume.

In an embodiment, the operation comprises a write operation on the particular table, the write operation comprising an update or an insert to the particular table, and the compute service manager 108 generates a new set of data files based on performing the write operation on the particular table.

In an embodiment, the operation comprises a read operation on the particular table, and the and the compute service manager 108 provides query results based on performing the read operation on the particular table.

FIG. 12 is a flow diagram illustrating operations of a database system in performing a method, in accordance with some embodiments of the present disclosure. The method 1200 may be embodied in computer-readable instructions for execution by one or more hardware components (e.g., one or more processors) such that the operations of the method 1200 may be performed by components of network-based database system 102, such as components of the compute service manager 108 or a node in the execution platform 110. Accordingly, the method 1200 is described below, by way of example with reference thereto. However, it shall be appreciated that the method 1200 may be deployed on various other hardware configurations and is not intended to be limited to deployment within the network-based database system 102.

At operation 1202, the compute service manager 108 generates a new version of the set of EP files on the internal storage.

At operation 1204, the compute service manager 108 generates new EP file data persistence object that maps the new version of set of EP files to new set of manifest files on the external volume.

At operation 1206, the compute service manager 108 generates a new set of manifest files of the particular table on the external volume, the new set of manifest files corresponding to the new set of data files.

At operation 1208, the compute service manager 108 generates a new manifest list based on the new set of manifest files on the external volume.

At operation 1210, the compute service manager 108 generates a new metadata file that points to the new manifest list on the external volume.

At operation 1212, the compute service manager 108 generates a new row in an external metadata file table that includes at least a location of the new metadata file on the external volume and a new snapshot identifier (ID) of the particular table on the external volume, the new snapshot ID corresponding to a new table version tracked by the internal storage.

Figure 13:
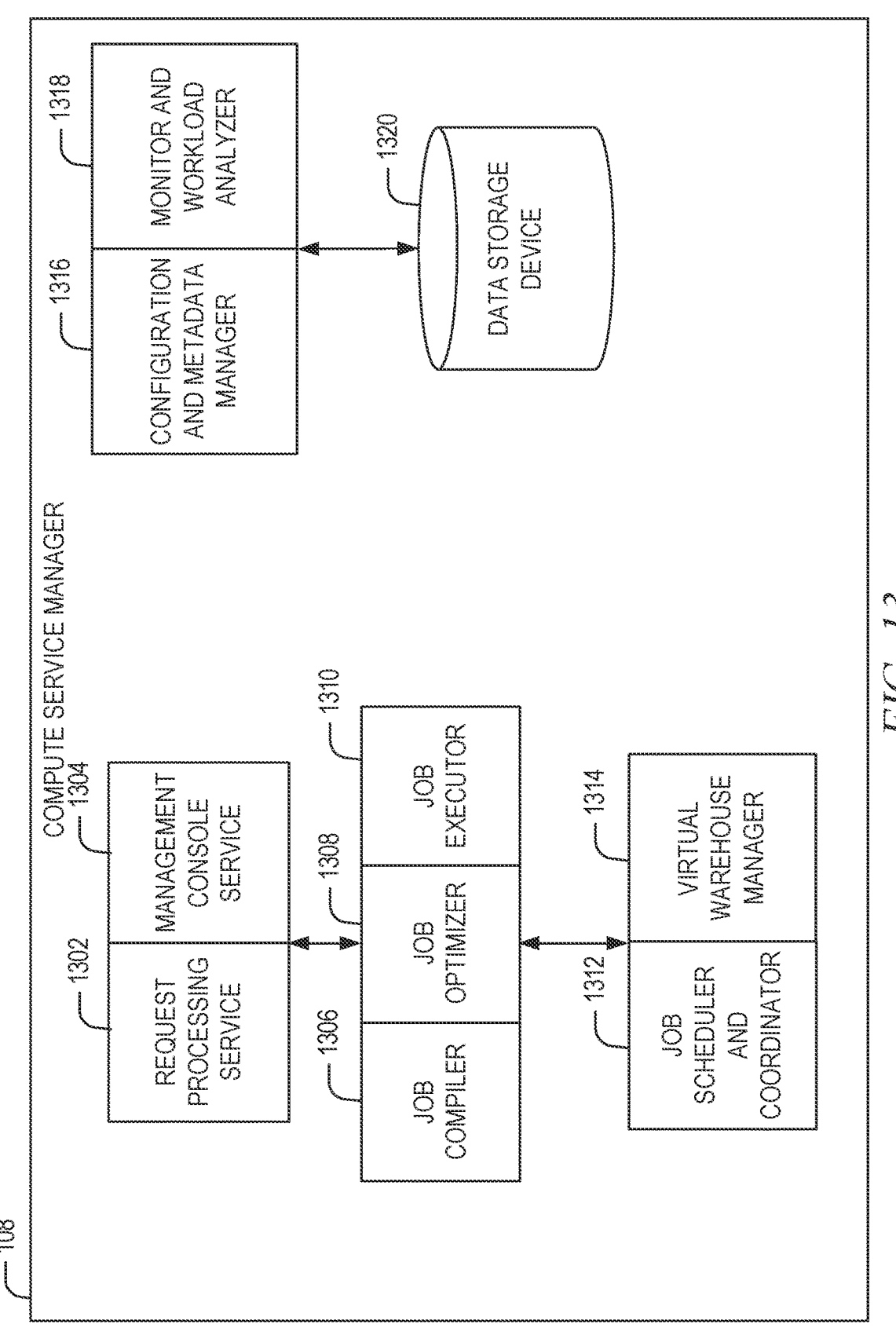
FIG. 13 is a block diagram illustrating components of a compute service manager, in accordance with some embodiments of the present disclosure.

FIG. 13 is a block diagram illustrating components of the compute service manager 108, in accordance with some embodiments of the present disclosure. As shown in FIG. 13, request processing service 1302 manages received data storage requests and data retrieval requests (e.g., jobs to be performed on database data). For example, the request processing service 1302 may determine the data necessary to process a received query (e.g., a data storage request or data retrieval request). The data may be stored in a cache within the execution platform 110 or in a data storage device in cloud storage provider system 104-1.

A management console service 1304 supports access to various systems and processes by administrators and other system managers. Additionally, the management console service 1304 may receive a request to execute a job and monitor the workload on the system.

The compute service manager 108 also includes a job compiler 1306, a job optimizer 1308 and a job executor 1310. The job compiler 1306 parses a job into multiple discrete tasks and generates the execution code for each of the multiple discrete tasks. The job optimizer 1308 determines the best method to execute the multiple discrete tasks based on the data that needs to be processed. The job optimizer 1308 also handles various data pruning operations and other data optimization techniques to improve the speed and efficiency of executing the job. The job executor 1310 executes the execution code for jobs received from a queue or determined by the compute service manager 108.

A job scheduler and coordinator 1312 sends received jobs to the appropriate services or systems for compilation, optimization, and dispatch to the execution platform 110. For example, jobs may be prioritized and processed in that prioritized order. In an embodiment, the job scheduler and coordinator 1312 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 1312 identifies or assigns particular nodes in the execution platform 110 to process particular tasks. A virtual warehouse manager 1314 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 1316, which manages the information related to the data stored in the remote data storage devices and in the local caches (e.g., the caches in execution platform 110). The configuration and metadata manager 1316 uses the metadata to determine which data micro-partitions need to be accessed to retrieve data for processing a particular task or job. A monitor and workload analyzer 1318 oversee processes performed by the compute service manager 108 and manages the distribution of tasks (e.g., workload) across the virtual warehouses and execution nodes in the execution platform 110. The monitor and workload analyzer 1318 also redistribute tasks, as needed, based on changing workloads throughout the network-based database system 102 and may further redistribute tasks based on a user (e.g., "external") query workload that may also be processed by the execution platform 110. The configuration and metadata manager 1316 and the monitor and workload analyzer 1318 are coupled to a data storage device 1320. Data storage device 1320 in FIG. 13 represent any data storage device within the network-based database system 102. For example, data storage device 1320 may represent caches in execution platform 110, storage devices in cloud storage provider system 104-1, or any other storage device.

Figure 14:
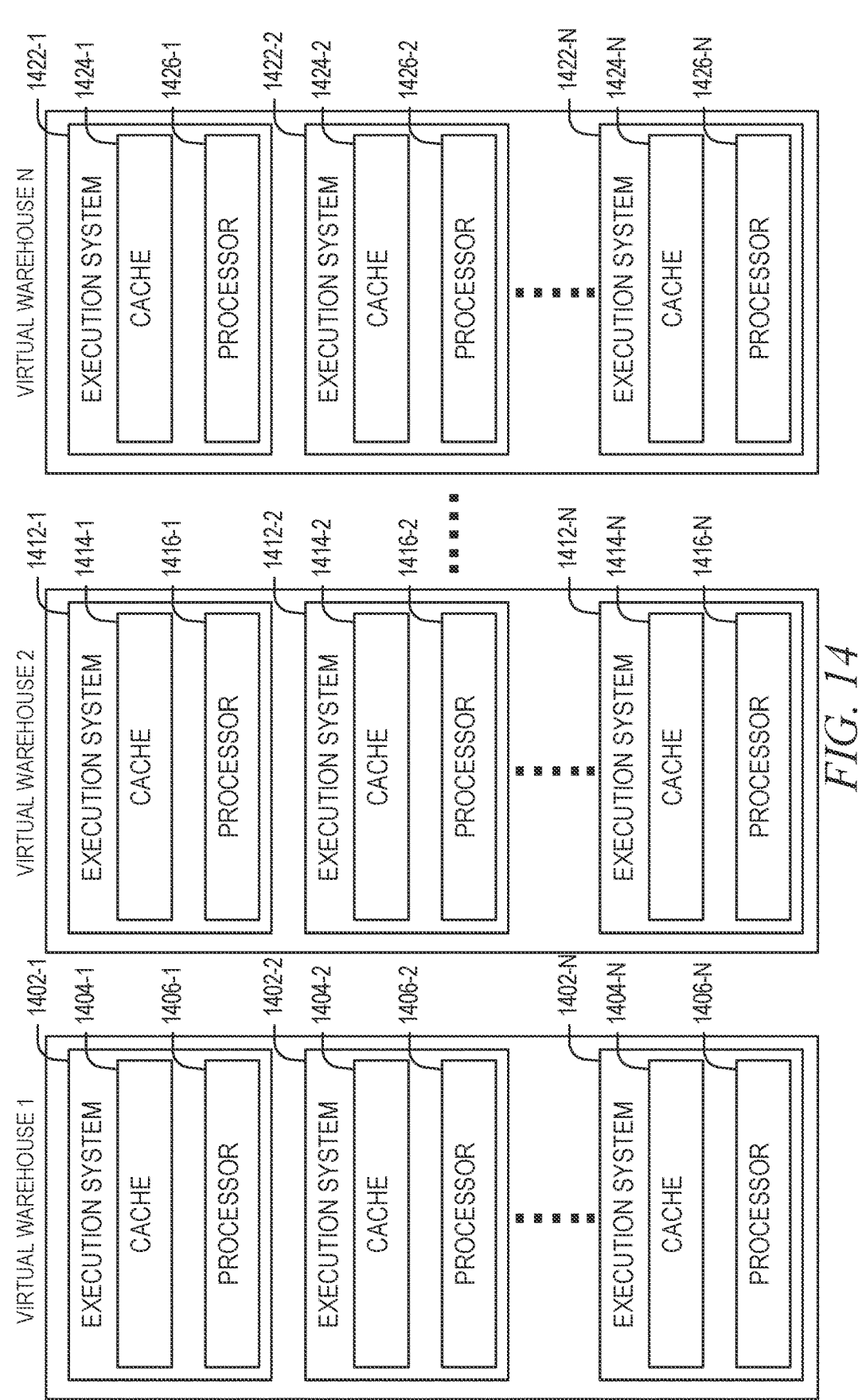
FIG. 14 is a block diagram illustrating components of an execution platform, in accordance with some embodiments of the present disclosure.

FIG. 14 is a block diagram illustrating components of the execution platform 110, in accordance with some embodiments of the present disclosure. As shown in FIG. 14, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage provider system 104-1).

Although each virtual warehouse shown in FIG. 14 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 124-1 to 124-$n$ shown in FIG. 1. Thus, the virtual warehouses are not necessarily assigned to a specific data storage device 124-1 to 124-$n$ and, instead, can access data from any of the data storage devices 124-1 to 124-$n$ within the cloud storage provider system 104-1. Similarly, each of the execution nodes shown in FIG. 14 can access data from any of the data storage devices 124-1 to 124-$n$. In some embodiments, a particular virtual warehouse or a particular execution node may be temporarily assigned to a specific data storage device, but the virtual warehouse or execution node may later access data from any other data storage device.

In the example of FIG. 14, virtual warehouse 1 includes three execution nodes 1402-1, 1402-2, and 1402-$n$. Execution node 1402-1 includes a cache 1404-1 and a processor 1406-1. Execution node 1402-2 includes a cache 1404-2 and a processor 1406-2. Execution node 1402-$n$ includes a cache 1404-$n$ and a processor 1406-$n$. Each execution node 1402-1, 1402-2, and 1402-$n$ is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 1412-1, 1412-2, and 1412-$n$. Execution node 1412-1 includes a cache 1414-1 and a processor 1416-1. Execution node 1412-2 includes a cache 1414-2 and a processor 1416-2. Execution node 1412-$n$ includes a cache 1414-$n$ and a processor 1416-$n$. Additionally, virtual warehouse 3 includes three execution nodes 1422-1, 1422-2, and 1422-$n$. Execution node 1422-1 includes a cache 1424-1 and a processor 1426-1. Execution node 1422-2 includes a cache 1424-2 and a processor 1426-2. Execution node 1422-$n$ includes a cache 1424-$n$ and a processor 1426-$n$.

In some embodiments, the execution nodes shown in FIG. 14 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 14 each includes one data cache and one processor, alternate embodiments may include execution nodes containing any number of processors and any number of caches. Additionally, the caches may vary in size among the different execution nodes. The caches shown in FIG. 14 store, in the local execution node, data that was retrieved from one or more data storage devices in cloud storage provider system 104-1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the cloud storage provider system 104-1.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 14 as having multiple execution nodes. The multiple execution nodes associated with each virtual warehouse may be implemented using multiple computing systems at multiple geographic locations. For example, an instance of virtual warehouse 1 implements execution nodes 1402-1 and 1402-2 on one computing platform at a geographic location and implements execution node 1402-$n$ at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage provider system 104-1, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Embodiments of the subject technology enable providing a unified table. Instead of presenting two table types to users, e.g., an external table and internal table, a unified table is just that-a single table. Instead, users can specify whether this table is a managed table or an unmanaged table.

As mentioned herein, managed tables are those where the subject system is the metastore/catalog for the table. Unmanaged tables are tables where an external catalog controls the table and the subject system integrates with that catalog to work with the table, but does not assume control of the table. Thus, an unmanaged table is one where the data is written to by an external system.

To "plug" the subject system into existing data, users connect the subject system to their catalog of choice. To do this, users create a CatalogIntegration inside of the subject system, which provides a single object for users to conjure metastores.

Whether a Catalog Integration is specified for a table will be the differentiator whether a table is "managed" or "unmanaged". This makes it easier to differentiate between something that are connecting to (e.g., unmanaged) versus something that the subject system is responsible for (e.g., managed). This also means that effectively users will only "see" this disappear when a table is fully converted from a managed to an unmanaged table.

The following discussion relates to creating a new catalog integration in a given account or replacing an existing integration. A catalog integration is an object that defines the source of metadata and schema for an Iceberg table that the subject system does not manage. A single catalog integration can support multiple Iceberg tables.

Syntax
```
CREATE [ OR REPLACE ] CATALOG INTEGRATION [IF NOT
EXISTS]
    <name>
    CATALOG_SOURCE = { GLUE | OBJECT_STORE }
    CATALOG_NAMESPACE = '<catalog-namespace>'
    TABLE_FORMAT = { ICEBERG }
    [ catalogParams ]
```

-continued
```
ENABLED = { TRUE | FALSE }
[ COMMENT = '{string_literal}' ]
```

Where:

```
catalogParams (for Glue Iceberg tables)::=
    GLUE_AWS_ROLE_ARN = '<arn-for-
    AWS-role-to-assume>' [
    GLUE_CATALOG_ID = '<optional-
    glue-catalog-id>' ]
    [ GLUE_REGION = '<optional-AWS-region-of-the-glue-catalog>' ]
```

Required Parameters
String that specifies the identifier (name) for the catalog integration; must be unique in the account.

In addition, the identifier must start with an alphabetic character and cannot contain spaces or special characters unless the entire identifier string is enclosed in double quotes (e.g. "My object"). Identifiers enclosed in double quotes are also case-sensitive.

CATALOG_SOURCE=<GLUE|OBJECT_STORE>
Specifies the type of catalog source. AWS Glue
GLUE: Creates an interface between Snowflake and AWS Glue. Object Storage
OBJECT_STORE: Creates an integration for Iceberg metadata files in an external cloud storage location that you associate with an external volume.
CATALOG_NAMESPACE='<catalog-namespace>'
Specifies the namespace (for example, database.schema) for the external catalog source when using GLUE as the CATALOG_SOURCE.
Do not specify a value for CATALOG_NAMESPACE if using OBJECT_STORE as the CATALOG_SOURCE.
TABLE FORMAT=<ICEBERG>
Specifies the table format supplied by the catalog. AWS Glue/Object storage
ICEBERG: Specifies Glue Iceberg tables or Iceberg tables from metadata in an external cloud storage location
ENABLED=<TRUE| FALSE>
Specifies whether the catalog integration is available to use for Iceberg tables.
TRUE allows users to create new Iceberg tables that reference this integration.
Existing Iceberg tables that reference this integration function normally.
FALSE prevents users from creating new Iceberg tables that reference this integration. Existing Iceberg tables that reference this integration cannot access the catalog in the table definition.
Optional Parameters
String (literal) that specifies a comment for the integration. Default: No value
Catalog Parameters (catalogParams)
Glue Iceberg GLUE_AWS_ROLE_ARN='<arn-for-AWS-role-to-assume>'
Specifies the Amazon Resource Name (ARN) of the AWS Identity and Access Management (IAM) role to assume.
GLUE CATALOG_ID='<optional-glue-catalog-id>'
Specifies the ID of the Glue Data Catalog.
GLUE REGION='<optional-AWS-region-of-the-glue-catalog>'
Specifies the AWS Region of the Glue Data Catalog.

Access Control Requirements

A role used to execute this SQL command must have the following privileges at a minimum:

| Privilege | Object | Notes |
|---|---|---|
| CREATE INTEGRATION | Account | Only the ACCOUNTADMIN role has this privilege by default. The privilege can be granted to additional roles as needed. |

EXAMPLES

The following example creates an integration that uses an AWS Glue catalog source. AWS Glue

```
CREATE CATALOG INTEGRATION
  glueCatalogInt
  CATALOG_SOURCE=GLUE
  CATALOG_NAMESPACE='my.catalog
  db' TABLE_FORMAT=ICEBERG
  GLUE_AWS_ROLE_ARN='<arn for AWS role to assume>'
  GLUE_CATALOG_ID='<optional catalog id>'
  GLUE_REGION='<optional AWS region of the Glue
  catalog>' ENABLED=true;
```

The following example creates an integration that uses Iceberg metadata in external cloud storage. OBJECT_STORE corresponds to the object storage that you associate with an external volume.
Iceberg Metadata

```
CREATE CATALOG INTEGRATION
  myCatalogInt
  CATALOG_SOURCE=OBJECT_STOR
  E TABLE_FORMAT=ICEBERG
  ENABLED=true;
```

Iceberg Tables from Parquet Data

In an embodiment, the subject system supports the ability for users to create Unified Iceberg Tables from loose Parquet files—that is Parquet files that do not have any table metadata on them yet. This will allow users to easily bring existing Parquet data to the subject system and utilize the Unified Iceberg Tables as a way to create a table format on top of it.
Conversion from Unmanaged to Managed In an implementation, Unified Iceberg Tables supports the ability to convert from Unmanaged to Managed. When a user wants to convert an unmanaged table to a managed table, they can run a command that will "convert" the table.

The following discussion relates to creating a new Iceberg table in a current/specified schema or replacing an existing table. Iceberg tables combine features such as fast SQL processing, security and authorization, and data governance with open Apache Iceberg metadata and storage.

Syntax

```
CREATE [ OR REPLACE ] ICEBERG TABLE [ IF NOT EXISTS ]
  <table_name>
    EXTERNAL_VOLUME =
    '<external_volume_name>'
    CATALOG =
```

-continued

```
'<catalog_integration_name>'
  CATALOG_TABLE_NAME =
  '<table_name>'
  FILE_PATH = '<relative_path_from_external_volume>'
  METADATA_FILE_NAME = '<metadata_file_name>'
  [ COMMENT = '<string_literal>' ]
```

Required Parameters

<name>

Specifies the identifier (name) for the table; must be unique for the schema in which the table is created.

In addition, the identifier must start with an alphabetic character and cannot contain spaces or special characters unless the entire identifier string is enclosed in double quotes (e.g. "My object"). Identifiers enclosed in double quotes are also case-sensitive.

EXTERNAL_VOLUME='<external_volume_name>'

Specifies the identifier (name) for the external volume where the Iceberg table stores its metadata files and data in Parquet files. Iceberg metadata and manifest files store the table schema, partitions, snapshots, and other metadata.

If not specified, the Iceberg table defaults to the external volume for the schema, if set, or the account.

CATALOG='<catalog_integration_name>'

Specifies the identifier (name) of the catalog integration for this table.

CATALOG_TABLE_NAME='<table_name>'

Specifies the table name as recognized by the catalog that you use. For most catalogs, this value is the namespace and table name of the table within the catalog.

This parameter cannot be changed after creating the table.

This parameter is not required for catalog integrations that use OBJECT_STORE as the CATALOG_SOURCE.

FILE_PATH='<relative_path_from_external_volume>'

Points to the metadata and data files as a relative path from the location.

FILE_PATH is required when you specify as the source for CATALOG.

This parameter cannot be changed after creating the table.

METADATA_FILE_NAME='<metadata_file_name>'

Specifies the name of the Iceberg metadata file to use for column definitions. This parameter is required when you create an Iceberg table from Iceberg metadata.

Optional Parameters

Specifies a comment for the table.

Default: No value

EXAMPLES

AWS Glue

This example create an Iceberg table that integrates with AWS Glue, specifying a CATALOG TABLE NAME.

```
CREATE OR REPLACE ICEBERG TABLE glue_src
  CATALOG='myIcebergGlueCatalog'
  EXTERNAL_VOLUME='glueCatalogVolume'
  CATALOG_TABLE_NAME='myGlueTable';
```

Iceberg Metadata

This example creates an Iceberg table in the current database using Iceberg metadata as input, specifying values for FILE_PATH and METADATA_FILE_NAME.

```
CREATE OR REPLACE ICEBERG TABLE iceberg_metadata_src
   CATALOG='my_catalog_integration'
   EXTERNAL_VOLUME='my_ext_volume'
   FILE_PATH='my/example/filepath/'
   METADATA_FILE_NAME='v2.metadata.json';
```

The following relates to support for unmanaged Iceberg tables.

To support an unmanaged Iceberg table, the subject system initially creates and then refreshes its metadata given a set of Parquet files stored where the source table is defined. At that point the Iceberg table can be queried, and it is critical that a "best of class" scan of such Iceberg tables is provided.

The following relates to generating EP files from Parquet metadata.

In an example, the EP file metadata of an unmanaged Iceberg table needs to be transactionally updated when the table is initially created and later refreshed. At that time, the subject system will have to generate EP files for the set of Parquet files which are added to the Iceberg table. Few challenges to solve here.

Full EP metadata: the subject system generates full EP metadata for each Parquet file added to the table, regardless of its source table format. It means that for each column in the target Iceberg table, the EP file will store its number of values when different than the number of rows (which happens for list/array elements which are using Dremel encoding), its min and max values, its number of distinct values, and its number of nulls. For struct, list, and map data types, the subject system will also have to generate EP metadata for each "sub-column" so that the subject system can also prune these complex data types.

EPs the subject system generate will be global for each Parquet file even if a Parquet file has several row groups. Hence, the subject system might have to derive the overall min, max, number of nulls and number of distinct values from row group metadata. For each Parquet file, the subject system will also have global stats like number of rows and file size. Additionally, the subject system will store some information about row groups, how many the subject system have and their min and max sizes. Finally, the subject system need to store additional Parquet file metadata like the Parquet file version, the offset of where the Parquet footer starts (or its size in bytes) and also the size of the section storing detailed column metadata, at a column page level. In an implementation, this is optional so the size will be 0 if it does not exist. In that case, the subject system will use row-group level min/max column stats or even overall file stats if those row-group level stats are missing.

The subject system remembers for each file metadata stored in an EP file the partition number this file belongs to, at all partitioning levels (up to 3). This is important to support optimizations like bucket pruning when bucketing is used.

In an implementation, the subject system also stores row-group level metadata in our EP files, at least to prune at a row group level, and can perform run-time pruning of these row groups.

Fast Parquet file inventory: the subject system determines the set of Parquet files to add to the table and also the set of files to remove when the table is later refreshed. This depends on the source table format. For Iceberg and Delta tables this is "easier" since the table format makes it easy to determine the set of files added and removed given the last refresh time. For Hive tables, the subject system lists all the files in new partitions to add them and tag files in partitions to remove them when the partition is removed. When files are added/deleted in existing partitions, the subject system can detect this by performing a full refresh, or storage notifications.

When a very large table is initially created, the subject system might have a lot of files to add. In an implementation, identifying the set of files to add is performed by a given execution node to parallelize that operation and offload a compute service manager as much as possible. It is understood that what the subject system does here can depend on the source table format.

Fast EP file generation: once the subject system determines the set of Parquet files to process, the subject system can start generating their associated EP files. Again, with a petabyte-scale Parquet table the subject system might have to process up to a few million files for the initial creation. Hence a challenge is to generate corresponding EP files quickly (e.g., in a few minutes for large tables). This is challenging since the subject system needs to scan the footer of each Parquet file to extract that metadata. Another challenge is to create a full manifest of the set of Parquet files to add, especially when the source table format is Hive where the subject system finds the list of Parquet files by listing files on blob storage. The subject system parallelizes this operation on a per partition basis in an implementation.

Always scan Parquet footers: the subject system generates EP file metadata by reading the Parquet metadata stored in the footer of each Parquet file. The subject system ignores any other metadata, like source Iceberg or Delta metadata.

Serverless: both the initial creation of the EP file metadata and then refreshing that metadata are performed serverless. The subject system piggybacks accesses a large pool of XP servers versus managing a dedicated pool.

Execution node (XP) generates EP file(s): XP directly generates EP files to save XP to compute service manager (GS) communication overhead and avoid GS from becoming the bottleneck since it is mostly single threaded. This will also protect GS from being overloaded. This way the subject system scales linearly with the number of XP workers allocated for the job.

Figure 15:
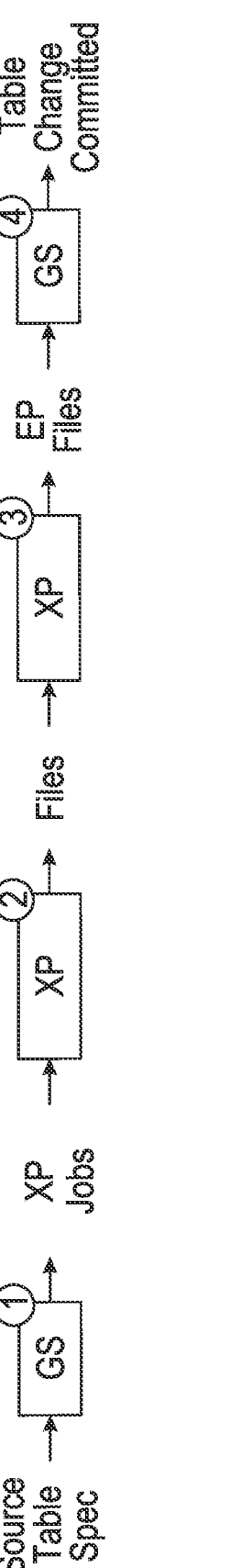
FIG. 15 illustrates an example processing flow of an initial creation of a table in accordance with at least one embodiment of the subject technology.

FIG. 15 illustrates an example processing flow 1500 of an initial creation of a table in accordance with at least one embodiment of the subject technology.

In an example, an initial creation of a table is somewhat easier since it does not require identifying files to delete. At the same time, for very large tables, the subject system parallelizes this operation very well if the subject system wants to scale properly. Another aspect to consider is the initial EP file clustering which might be important to consider, else compaction might be really expensive when files are deleted. In an example, an approach includes clustering on file names or file creation date, and adapting to the various source table formats the subject system needs to support. The overall process is described below, decomposed into four main phases where the first and last phases are performed by GS (e.g., compute service manager 108) while the heavy lifting happens in phase 2 and 3, executed by XP (e.g., execution node 1402-1).

Phase 1—GS Creates XP Jobs

This phase is executed by GS (e.g., compute service manager 108) and depends on the source table format. The goal of this phase is to generate multiple independent XP "inventory" jobs. As GS generates these jobs, it enqueues them in an FDB (FoundationDB) job queue, so that they can be processed in parallel, by XP, during phase 2. During phase 2, XP (e.g., execution node 1402-1) processes will process these jobs to generate one or more files. In this example, such files are simple manifest files which are providing the list of Parquet files to add (and/or to remove when refreshing the table).

The nature of a job depends on the source table format:
Iceberg source table: for an Iceberg table, GS (e.g., compute service manager 108) processes the file that stores the manifest list of the latest snapshot created for the Iceberg table. While processing that manifest list file, GS will generate multiple XP jobs. Each XP job has a subset of the manifest files of the source Iceberg table to process. In an implementation, GS ensures that one file does not contain more than 1 MB of manifest files to process and no more than 64 manifest files to process. It is appreciated, however, that a size of manifest files and a number of such manifest files for processing may be configurable to enable the subject system to handle various workloads.

Hive source table supported by an Hive metastore: in that case the subject system generates one job per partition of the source table. Each XP job points to the "directory" under which all files for one partition of the source table are stored. When XP (e.g., execution node 1402-1) executes one of these jobs, the XP process lists the blob storage directory associated with the partition being processed to generate one or more files listing the content of the directory.

Hive source table on bare blob storage: this case is similar to the above except that the subject system finds the list of partitions for the table by listing files on blob storage. In an example cloud storage system, one can issue a list command on the file prefix where the table is stored and specify "/" as a delimiter to get only top-level directories, i.e. partition directories. The rest is the same as above, the subject system parallelizes listing the content of each partition in XP.

Delta table: one example solution is to create from the last table checkpoint and then apply all versions after that one, normally no more than 10 versions. So if, at the time of its creation, the table had 2 versions (i.e., json version files) after its latest checkpoint, the subject system first creates a version from that latest checkpoint, then effectively perform 2 refreshes, then commits the create DDL command by making the table visible. When creating the initial table version from the latest Delta checkpoint, the subject system uses the different Parquet row group in each checkpoint file to generate multiple XP jobs, each generating one or more files.

Phase 2—XP Generates Files

In phase 1, GS (e.g., compute service manager 108) has generated several jobs which are enqueued in FDB to be processed in parallel, during phase 2, by one or more XP processes. Each of these jobs executed by XP (e.g., execution node 1402-1) will generate one or more files. A file simply lists a subset of the Parquet files to process during phase 3, and may be referred to as a "manifest file" in the below discussion. The file might contain additional information for each Parquet file, e.g., the partition the file belongs to. Each manifest file will not contain too many Parquet files, e.g., few hundreds at the most. A goal is to tune the maximum number of Parquet files listed in a manifest file so that the processing of each manifest file during phase 3 will take a few seconds at the most. Each manifest file generated by XP during phase 2 will be also registered to GS, in another FDB job queue. This queue will be processed by XP, in parallel, during phase 3.

Phase 3—XP Generates EP Files for the Table

EP files (e.g., metadata files that describe the data in the files) for the Iceberg table are generated by XP during phase 3. Each XP process assigned to that phase consumes manifest files from the FDB queue populated during phase 2 to generate one or more EP files. These EP files will be registered to GS. GS (e.g., compute service manager 108) registers these EP files on behalf of the first version of the Iceberg table being created. In an implementation, these EP files may undergo clustering by file name, by partition or by file creation time.

Phase 4—GS Commits the Initial Table Creation

Once all EP files have been generated, the table creation will be committed and the table metadata will be made visible, exactly like the subject system does for a regular CTAS (create table AS).

Refreshing an Unmanaged Iceberg Table

How and when the subject system refreshes an unmanaged Iceberg table will depend on the table format. For table formats like Iceberg or Delta, it is easier and computationally cheaper to detect new commits while things are much more computationally expensive and complex for a Hive table.

Refreshing from a source table using the Iceberg or Delta table format

Detecting that a source Iceberg or a Delta table has changed is computationally cheap. In an example, the subject system has 2 scenarios:

The source table is Delta or Iceberg managed by a Hadoop directory structure. In that case, detecting a new commit only involves performing a head request on a single file. For Delta, the subject system detects that a new commit json file has been produced for the next table version sequence number. For Iceberg, the subject system can check if the file metadata/version-hint.text has changed since the last refresh or initial creation.

If the source table is Iceberg and managed by a proper catalog such as Glue or a Hive metastore, then the subject system queries the catalog to ask for the latest snapshot to detect if there was a change.

In an implementation, the subject system replays all commits between the last one the subject system refreshed from and the latest commit of the source table. A preference would be to replay all commits so that the subject system have a one to one between our Iceberg table and the source table. Not only should the subject system re-play all commits but also purge all versions which have been removed from the source table. This way the subject system can fully support time travel on the unmanaged Iceberg table.

Replaying the next commit can be accomplished by unregistering the files which have been deleted and adding the ones which are new. In an implementation, the subject system validates that the deleted files exist in the base table. Also, the subject system finds the EP file which contains the file being deleted. Similar to what the subject system does for a copy operation, the subject system builds a bloom vector on file name to locate the EP file storing a given Parquet file, given its name.

The process of adding new Parquet files to the table will be the same as the one used during the initial creation. The subject system potentially generates several files and then let XP generate new delta EP files.

Refreshing from a Source Table Using the Hive Table Format

For Hive tables (with or without a metastore), refreshing can be more complicated. One way to deal with this to follow external table and leverage blob storage notifications to detect when files are added or removed to trigger a corresponding change. For file removal, there will be a lag between a file removal and changing the Iceberg metadata. Until the subject system does this, scanning a file which has been deleted would generate an error XP, so the subject system needs XP to ignore these "file missing" errors for external files scanned in Iceberg tables. An assumption is that the subject system does the same for external tables in an implementation. Ideally, instead of reporting an error, XP lets GS know that the file has been deleted so that this could be propagated to the EP file metadata. Generally the subject system should leverage whatever the subject system does for a given Hive external table, and the subject system will also generate fully EP metadata by scanning the footer of each Parquet file.

Dealing with Table Schema Evolution

The subject system automatically evolves the Iceberg table schema when the source table schema has changed and properly maps table columns in that schema with the fields in Parquet files. The subject system also deals with Parquet files which are not compliant with the schema of the table. Also, the subject system handles and properly tracks the schema evolution of source Iceberg tables.

Efficient Scanning and Pruning

The subject system efficiently scans Iceberg tables, whether they are managed or unmanaged. The subject system has two big buckets of work here.

Run-Time Parallelization and Pruning

GS will only operate on the overall Parquet files, as it does for FDN files, and will prune out the set of files which are not qualifying the where clause of the query. After this initial coarse grain pruning, GS will generate an initial scanset which will be used to only scan the extended footer of the set of qualifying files. Hence, this initial scanset will only contain the offset of each Parquet footer so that XP will scan only the footer of these files. At run-time, the footer sections of this initial scanset will be processed by XP to produce a more refined row-group level scanset. This second "fine-grain" scanset will provide specific instruction to RsoScan to scan the data portion of each row-group which is relevant for the query.

First, the subject system further parallelizes and prunes the scan operation at a finer granularity than a Parquet file since Parquet files are generally too large (e.g. several gigabytes). Instead, the subject system uses row groups as the unit of parallelization while the subject system will prune all the way down to column pages assuming that the Parquet file contains a page index with stats for each column. Also, run-time pruning handles join-pruning, using ranges produced on the build side. Supporting search optimization based pruning can be provided in an implementation. For join-pruning, this should also be performed at a page level (first row-group level, then page level). For search optimization, operating at a page level can be provided. Also, the subject system tries to leverage the optional bloom filter which is created on high-cardinality columns.

Second part relates to scanning very efficiently the data sections of the Parquet file which have not been pruned out. For this, the subject system uses an internal scanner (e.g., instead of using an external scanner), and the subject system supports various encoding, converting all type representation to newer representation, and supporting older versions of Parquet files.

Pruning Column Pages

Several RSOs will be used to build this second-level scanset which is much more fine-grain. This second-level scanset will have one entry per row-group. For a given row-group, and for each column which is accessed by the query, the scanset entry will provide the set of start/end page offsets to access and the set of rows to select in the page.

The following is an example. Assume that the subject system has a table T with three columns, A, B and C. Assume for now that the table has only one Parquet file with 1 row group and 10 rows. The following table shows the different values of each column and the set of pages for each of these columns. For example column A has 4 pages with the following min/max values: (3,7), (1,7), (8,14), (19,20). For each column, the Parquet (extended) footer will store the min/max values for each of these pages.

| Row Index | Column A | Column B | Column C |
|---|---|---|---|
| 0 | 7 | 56 | 2 |
| 1 | 3 | 58 | 9 |
| 2 | 5 | 90 | 4 |
| 3 | 7 | 25 | 18 |
| 4 | 1 | 89 | 190 |
| 5 | 14 | 123 | 12 |
| 6 | 8 | 76 | 90 |
| 7 | 9 | 38 | 13 |
| 8 | 19 | 87 | 45 |
| 9 | 20 | 30 | 78 |

In an example, the following query is executed:

select A, B, C from T where A>13 and C=190;

When scanning the footer of that Parquet file, by leveraging the min/max value of each column page, the subject system can prune out page 0 and 1 of column A and page 0, 1, 3, and 4 of column C. The following table shows the pages which are selected and the ones which are eliminated.

Because the subject system know the row first/last index of each of these column pages, the subject system can derive the index of the rows which are selected.

In this example, only the row at index 5 is selected.

| Row Index | Column A | Column B | Column C |
|---|---|---|---|
| ~~0~~ | ~~7~~ | 56 | ~~2~~ |
| ~~1~~ | ~~3~~ | 58 | ~~9~~ |
| ~~2~~ | ~~5~~ | 90 | 4 |
| ~~3~~ | ~~7~~ | 25 | 18 |
| 4 | ~~1~~ | 89 | 190 |
| 5 | 14 | 123 | 12 |
| ~~6~~ | 8 | 76 | ~~90~~ |
| ~~7~~ | 9 | 38 | ~~13~~ |
| ~~8~~ | 19 | 87 | ~~45~~ |
| ~~9~~ | 20 | 30 | ~~78~~ |

The scanset entry generated by XP for this particular row group will instruct RsoScan (rowset operator scan) to read page 2 of column A (start/end offset will be provided to read that page), page 3 of column B, and page 2 of column C. Also, the scanset will tell RsoScan that for this row group, only the row at index 5 is selected. This information is provided as a compressed bitset.

Figure 16:
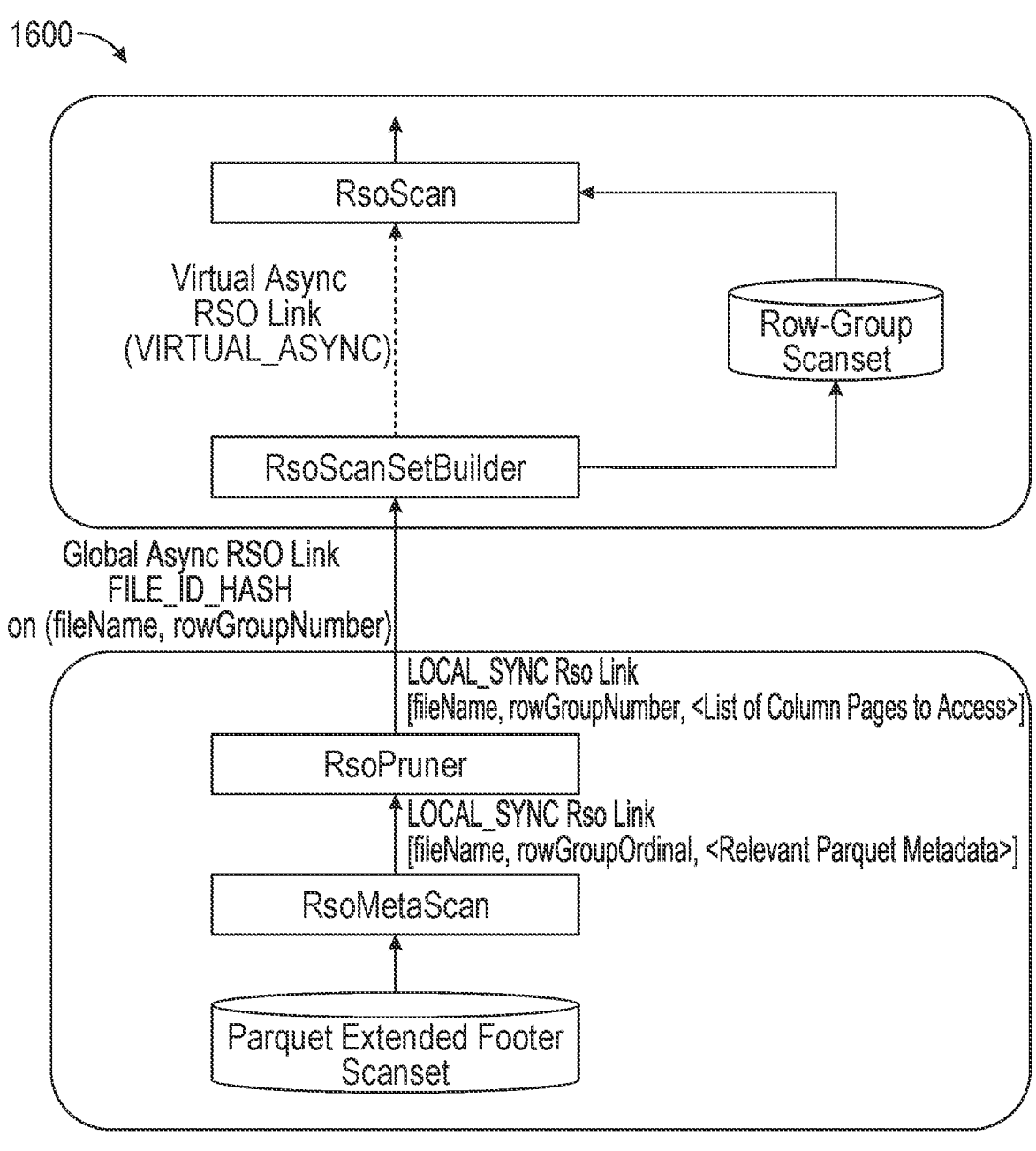
FIG. 16 illustrates an example of how an execution node (XP) builds a row group scanset from a Parquet footer scanset.

FIG. 16 illustrates an example 1600 of how an execution node (XP) builds a row group scanset from a Parquet footer scanset.

To build the row-group scanset, GS allocates 3 RSOs, in blue in the above drawing. Rows produced by this plan fragment will be pipelined to the RsoScan plan fragment. The subject system implements a pipeline for two important reasons:

It is important to start running RsoScan as soon as possible after the query starts, overlapping the execution of RsoScan with building the row-group scanset.

Not only it will make it easier to better use all XP resources at once but also will make it faster to produce the first N rows which is critical for queries such as "select * from T where <pred> limit 10;" or for top-N queries. For top-K queries, the subject system need to push down the pruning predicate derived from executing top-K to both scansets, or at least to the Parquet scanset.

RsoScanSetBuilder builds a row-group scanset where each entry in this scanset can consume quite a lot of memory because it describes all column chunks to read (see below). So if the subject system provides a pipeline, RsoScanSetBuilder will stop consuming data when the subject system are under memory pressure, avoiding OOM errors. Basically, the subject system does not need to materialize in memory the entire row-group scanset if it is very large.

The following describes this execution plan fragment starting from the bottom:

1. Parquet footer scanset: as mentioned earlier, this scanset is built by GS and is passed to XP in the execution plan of the query. The only difference from a FDN scanset is that the size in bytes of each (extended) file footer is specified using an array of integers, parallel to the array of file names. Note that this is the extended Parquet footer, which includes both column indexes and offset indexes for all columns and row groups. Moreover, the subject system caches the extended footer in XP servers.

2. RsoMetaScan: this is a scan like RSO which works similar to RsoScan but will only read the extended footer of each Parquet file it scans. The extended footer is the Parquet file footer plus the column pages metadata which is stored just before it. Because footers are small in size (say few hundreds of KBs), RsoMetaScan in each worker process will enqueue many footer read operations at once (the subject system need to play with that number, but potentially hundreds of them). Like RsoScan, the footer of a Parquet file will be cached on the XP server where it is read and file stealing will work too, again exactly like RsoScan.

For each Parquet file footer it reads, RsoMetaScan will generate one row per row group. Each row will have as many columns as the number of columns selected by the query. Using the simple example above, RsoScanMeta will generate 3 columns, for column A, B and C. For each column, as a nested structure, RsoScanMeta will serialize global information, in particular the overall min/max values for the row group, encoding, and optionally the set of column page information, in particular min/max values for each page, offset, row index and compressed/uncompressed size. The subject system serializes this information using a variant column. Finally, note that RsoMetaScan needs to map columns defined in the SDL to columns (or subcolumns) defined in the Parquet file. This mapping will leverage the optional field_id stored with the table schema. If the field_id is not available, the subject system will resolve using the column/subcolumn name.

3. RsoPruner: this is where all pruning logic will execute. Since column pages min/max stats are optional in an example, the pruner will first prune row groups using row group min/max values. When a row group is not pruned, RsoPruner will then optionally prune column pages in the row group.

RsoPruner produces one row per row group to access, and for each row group, it precisely tells RsoScan the set of column pages to read. If contiguous pages for a column are not pruned, they will be lumped together in one single chunk to read. Hence, RsoPruner will tell RSO scan, for each column, the set of chunks to read. For each chunk it will specify the offset of the chunk in the Parquet file, its size in bytes, the number of rows in the chunk, and the index of the first row. Note that these column chunks are not aligned across all columns to read so RsoScan will derive from this information the set of rows which can be skipped in each chunk. No need to propagate this information across the two RSOs.

4. RSO Link RsoPruner→RsoScanSetBuilder: this RSO link is async and redistributes the rows using the affinity of a row group to an XP node. For each row, to determine the worker process this row needs to be sent to, the subject system will hash on (fileName, rowGroupNumber) and then use the worker process hash ring to determine that target worker rank.

Within a worker process, the subject system will always send rows to instance 0 of RsoScanSetBuiler, hence other instances of RsoScanSetBuilder will not be used. This is because the subject system does not want to buffer too many rows before sending them to a worker. The subject system might have to flush the pipe after a few rows only to avoid buffering too much. Also, sending all rows to instance 0 of each worker means that RsoScanSetBuilder will run serially in each worker process, which simplifies a lot.

This RSO link is using the same hash ring used by GS to assign FDN files to XP workers, the only difference with a scanset of FDN files is that for a row-group scanset the subject system also use the row group number in the hash function, in addition to the file name. The subject system does this to maximize caching effects. Hence, multiple row groups from the same Parquet file might be consumed by several XP worker processes while the footer is read (and cached) by a different worker process. The subject system modifies the DOP downgrade logic that GS executes to avoid removing XP servers which have a row group assigned to them. Since GS knows how many row groups each Parquet file has, it can virtually hash all possible combinations of (<Parquet file name>, <row group #>) to make sure that no XP servers with affinity to a group are removed.

5. RsoScanSetBuilder: as mentioned above, only instance 0 of that RSO will be active in each worker process. This RSO builds a scanset entry from each row it receives and inserts that entry in the scanset structure, which is really a link list of scanset entries. This RSO is more complicated than this because it needs to overlap its execution with RsoScan, and performs very similar to the way a continuous scanset works. The main difference here is that the scanset is fed from RsoiScanSetBuilder[0] versus fetched from GS. Ideally the two code paths would be the same, one thread feeding the scanset asynchronously and RsoiScan threads consuming from it with some control flow logic between the two. At least when RsoScanSetBuilder is terminated, the subject system may start the stealing process.

In an implementation, the following could be performed: RsoiScanSetBuilder[0], when it is invoked to consume a RowSet, will deserialize the variant ColSet and generate several scanset entries that it will add to the local scanset structure shared with RsoScan. Adding to the scanset needs to be protected by a mutex because the scanset is consumed by the RsoiScan threads.

When RsoiScanSetBuilder has processed its first RowSet, it will activate all instances of RsoScan in the worker process. This is similar to the way leaf RSOs like RsoScan is activated by the control, and the code here is trivial, the function to activate a RSO already exists.

Control flow i. When the scanset has too many entries which have not yet been consumed (e.g., 200), RsoiScanSet-Builder[0] will not return from the call but instead wait on a condition "scansetNotFull".

ii. The condition "scansetNotFull" will be posted by RsoScan when the number of entries in the scanset falls below a certain threshold (say 50).

iii. Waiting here will cause the pipeline feeding RsoScanSetBuilder to stop until the execution is resumed when the condition is posted.

iv. When RsoiScanSetBuilder[0] adds entries to the scanset and this scanset is empty, it will post the condition "scanSetNotEmpty" to wake-up RsoiScan threads which were waiting for work.

When RsoiScanSetBuilder[0] is terminated (i.e., pipeline feeding it is globally terminated), it will mark that the scanset is now terminated. It will also post any RsoScan instances which are waiting for the "scan-SetNotEmpty" condition (see below).

6. RsoScan: as mentioned above, this RSO is activated by RsoScanSetBuilder. Each of its RsoiScan thread works as follows:

When activated, a RsoiScan thread will start to consume and process the scanset entries that RsoiScanSetBuilder [0] has added to the scanset.

Each scanset entry describes exactly the set of column chunks (i.e. contiguous set of column pages) that RsoScan needs to read. RsoScan will schedule the necessary IOs to read those. Reading is async in XP and uses an async action queue. SfFile knows how to leverage the SSD cache to read these column chunks and if remote IOs are performed, will know how to cache that data. Since RsoScan is told the index of the rows in each chunk it needs to read, it will derive the subset of rows to access in each chunk, skipping the others. RsoScan will then select the other rows, apply-ing predicate push down logic that will lead to poten-tially further row skipping.

When an entry has been consumed, it will be freed so that the memory it was consuming is reclaimed.

When the number of entries in the scanset goes under a certain threshold (e.g. 50), the condition "scansetNot-Full" will be posted so that RsoiScanSetBuilder[0] can resume its work.

If there are no more entries in the scanset, and the scanset is not marked as being terminated, then the RsoScan instance thread will wait on the condition "scan-SetNotEmpty".

If the scanset is empty and has been terminated by RsoiScanSetBuilder[0], it will mean that the pipeline feeding the scanset has terminated. Hence, file stealing can start, i.e. RsoScan can start stealing scanset entries from another worker process.

When stealing is finished, RsoScan can terminate.

Support for Managed Iceberg Tables

The subject system converts an unmanaged table to a managed one, writes Parquet files efficiently, being a proper Iceberg catalog, optionally manages encryption of data.

Converting to Iceberg Managed Tables

The main challenge here is to associate an external volume for the table since now the subject system need to write Iceberg metadata. Also, if the table was partitioned, had a sort order, and was using bucketization, the subject system would have to "downgrade" the table because the subject system may not support this.

Being a managed table means that the subject system would have to stop refreshing the table, flip it to be managed, and become the main catalog for the table.

External DMLs (Commit Snapshots)

The subject system supports external DMLs against Ice-berg tables managed by the subject system. To commit a new snapshot provided by an external tool, the subject system validates that the snapshot is correct, i.e., does not contain files which have already been deleted.

Writing Parquet Files

To support managed tables involves writing Parquet files and producing EP files for them, including EPs for struct, list and maps. The other challenge is to generate somewhat big Parquet files, else it would be difficult for other systems to integrate with the subject system. Composing very large Parquet files is challenging because the subject system would have to use a multipart upload model and this requires special cleanup. In an implementation, Parquet files are created with a single larger row group, e.g., 64 MB. Proper column page indexes are generated to maximize pruning efficiency. If the subject system produces a bloom filter for high cardinality columns, the subject system should also do the same for FDN files and store these bloom filters in the header of the FDN file.

Handling Struct, Maps and List

The subject system supports this new data type (e.g., struct, map and list) and also properly writes this data, with proper EP files Being the Iceberg Catalog The subject system supports a full-fledged Iceberg cata-log. The subject system efficiently writes proper snapshots metadata when changes are committed to the table. The subject system optimizes this potentially writing manifest files from XP. In an implementation, the subject system integrates with the Iceberg ecosystem such that the subject system can push changes to other catalog and have other systems pull the different versions.

In an implementation, the user creates and manages an external volume object rather than a stage or storage inte-gration (which has been discussed before).

The syntax for creating an external volume may specify that encryption is on the storage location(s) rather than as a top-level property. Moreover, the "table_format" is not utilized in an implementation for creating an external vol-ume.

The following describes an example of Iceberg table conversion from unmanaged to managed.

alter iceberg table unmanagedTable convert to managed;

This will transition ownership of the table's catalog from an external source to the subject system. The table will also become writable, and changes to the table will not be written back through an external catalog. The subject system clears properties that are only used by unmanaged tables in the DPO, including CATALOG_TABLE_NAME, PARTITION BY, AUTO_REFRESH, and AWS_SNS_TOPIC_ARN.

The subject technology clears the CATALOG table lin-eage parameter value if it is set at the table level. The subject technology also confirms that the external volume is writ-able.

The following is a discussion of various end to end examples.

Creating an Unmanaged Table from an Iceberg Glue Catalog
    Step 1: create the external volume

```
CREATE OR REPLACE external volume
glueCatalog Volume STORAGE_LOCATIONS =
(
    (
    NAME = 'gluelocation'
    STORAGE_URL = 's3://myS3region 1bucket/mygluecatalogpath'
    STORAGE_AWS_ROLE_ARN = 'xx'
    )
) ALLOW_WRITES=false;
```

Step 2: create the catalog integration using a Glue catalog
    for Iceberg tables (in some embodiments, a refresh
    interval mentioned below is optional, and a connection
    string can be a set of one or more connection properties
    specified as a string of one or more properties) create
    catalog integration myIcebergGlueCatalog

```
            CATALOG_SOURCE=GLUE
            TABLE_FORMAT=ICEB
            ERG
            REFRESH_INTERVAL_
            SECONDS=30
            CONNECTION_STRING
            ='<myConnStr>';
```

Step 3: create the unmanaged table
    Because the table format is Iceberg, we don't need the
    user to provide the table schema (and will fail if it's
    specified).

```
    create iceberg table myGlueTable
        EXTERNAL_VOLUME='glueCatalogVolume'
        CATALOG='myIcebergGlueCatalog'
        CATALOG_TABLE_NAME='myGlueTable'
        AUTO_REFRESH=true;
```

Step 4: Refresh the table to the newest version
    The subject system pulls for changes to the table, but
    the user can also issue a refresh command if they
    want to immediately refresh to the latest version.
    alter iceberg table myGlueTable refresh;
Creating a Managed Table from Parquet Loose Files
    Step 1: create the external volume with storage locations
    for the existing and new files

```
    CREATE OR REPLACE external volume parquetFilesVolume
    STORAGE_LOCATIONS =
    (
    (
    NAME = 'dataLakeRegion1Location'
    STORAGE_URL = 's3://myS3region1bucket/myparquetdatalake'
    STORAGE_AWS_ROLE_ARN = 'xx'
    )
    ) ALLOW_WRITES=true;
```

Step 2: create the catalog integration using a Storage
    Prefix and no table format create catalog integration
    myParquetFilesCatalog

```
CATALOG_SOURCE=OBJECT_STORE
TABLE_FORMAT=NONE
AWS_SNS_TOPIC_ARN='arn:aws:sns:us-west-2:001234567890;s3_mybucket';
```

Step 3: create the unmanaged table
    If the customer doesn't specify table columns, they will be
    inferred from the Parquet schema.

```
create iceberg table footwearInventory
EXTERNAL_VOLUME='parquetFilesVolume'
CATALOG='myParquetFilesCatalog' FILE_PATH='Inventory/footwear'
PARTITION BY (p1,p2) AUTO_REFRESH=true
REFRESH_INTERVAL_SECONDS=15;
```

Figure 17:
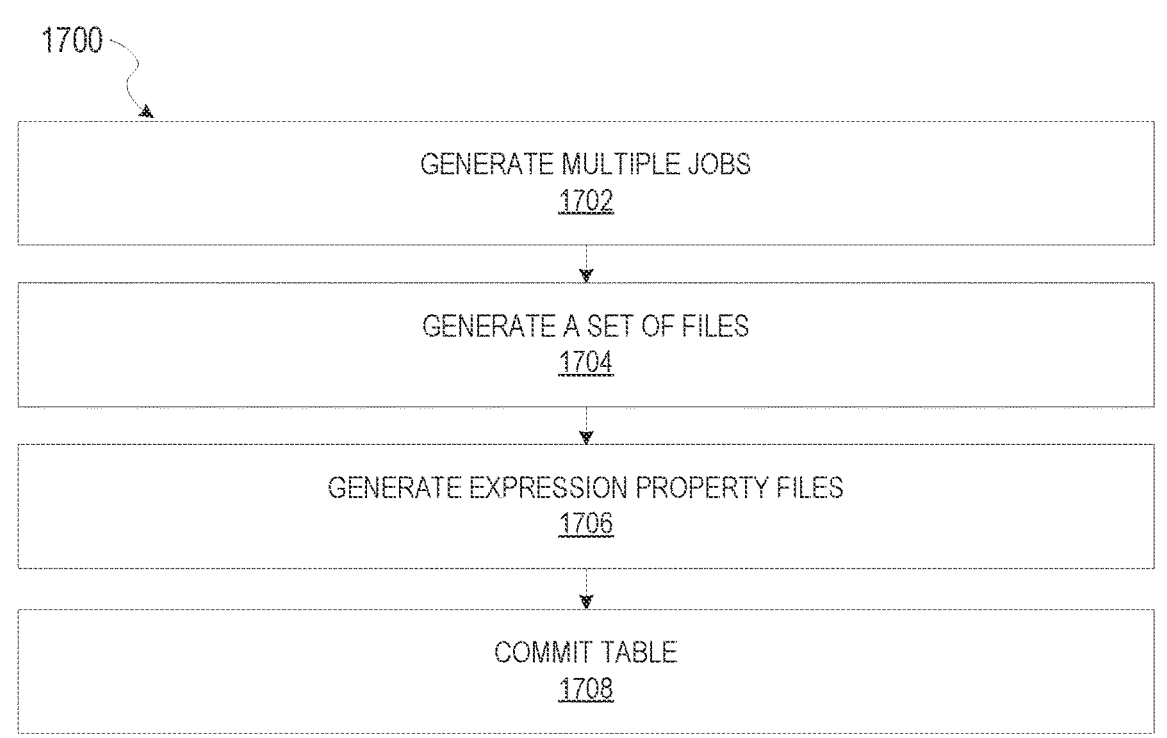
FIG. 17 is a flow diagram illustrating operations of a database system in performing a method, in accordance with some embodiments of the present disclosure.

Step 4: Add new Parquet files using a Refresh command
    The table will automatically get these files through auto-
    refresh, but the customer can also manually refresh.
    alter iceberg table footwearInventory refresh<path>;
Step 5: convert the unmanaged table to a managed table
    to make it writable and provide a path for writing files
    alter iceberg table footwearInventory convert to managed;
    Desc iceberg table footwearInventory; now shows the
    CATALOG property as SUBJECTSYSTEM.
    At this point, the following happens:
        External volume write and delete privileges are
            verified. If the subject system does not have write
            and delete privileges, the system fails the conver-
            sion.
        The catalog integration is no longer used by the
            Iceberg table
        The table is now writable. New metadata files will be
            written to the paths below.
        The Iceberg catalog now shows the table as managed
            by the subject system
        The subject system is responsible for deleting data
            files that go out of table retention
        All writes to the table must go through the metadata
            layer.
    FIG. 17 is a flow diagram illustrating operations of a
database system in performing a method, in accordance with
some embodiments of the present disclosure. The method
1700 may be embodied in computer-readable instructions
for execution by one or more hardware components (e.g.,
one or more processors) such that the operations of the
method 1700 may be performed by components of network-
based database system 102, such as components of the
compute service manager 108 or a node in the execution
platform 110. Accordingly, the method 1700 is described
below, by way of example with reference thereto. However,
it shall be appreciated that the method 1700 may be
deployed on various other hardware configurations and is
not intended to be limited to deployment within the network-
based database system 102.
    At operation 1702, the compute service manager 108
generates multiple jobs based on a source table format of a
source table.
    At operation 1704, the execution node 1402-1 generates
a set of files based on the multiple jobs.
    At operation 1706, the execution node 1402-1 generates
a set of expression property files for a new table based on the
set of files.
    At operation 1708, the compute service manager 108
commits the new table created based at least in part on the
set of files.

In an embodiment, the execution node 1402-1 performs further operations including: determining a first set of files that were added since a previous refresh of the source table, the previous refresh comprising a prior time when a snapshot of the source table was obtained; and determining a second set of files that were removed since the previous refresh of the source table.

In an embodiment, the execution node 1402-1 performs further operations including: identifying a particular file, the particular file storing a manifest list of a current snapshot of the source table.

In an embodiment, the set of files are generated based on the manifest list, each file comprising a set of files from the manifest list.

In an embodiment, the new table comprises an unmanaged table.

In an embodiment, an external catalog controls the unmanaged table.

In an embodiment, each expression property file from the set of expression property files comprises at least a number of values when different than a number of rows, a minimum value and a maximum value, a number of distinct values, and a number of null values.

In an embodiment, the execution node 1402-1 performs further operations including: determining that changes to the new table has occurred since committing the new table; and performing a refreshing process to update the new table with a first set of files that have been added and a second set of files that have been removed.

In an embodiment, the set of expression property files are stored in a metadata database, the metadata database being a different storage location than a particular storage location of the new table. However, it is appreciated that a different storage location is not required, and in some implementations, the storage location may be the same storage location (e.g., where expression property files are stored in the same location as the particular storage location of the new table).

In an embodiment, the execution node 1402-1 performs further operations including: processing, by the execution node, the set of files in parallel to generate the set of expression property files.

Figure 18:
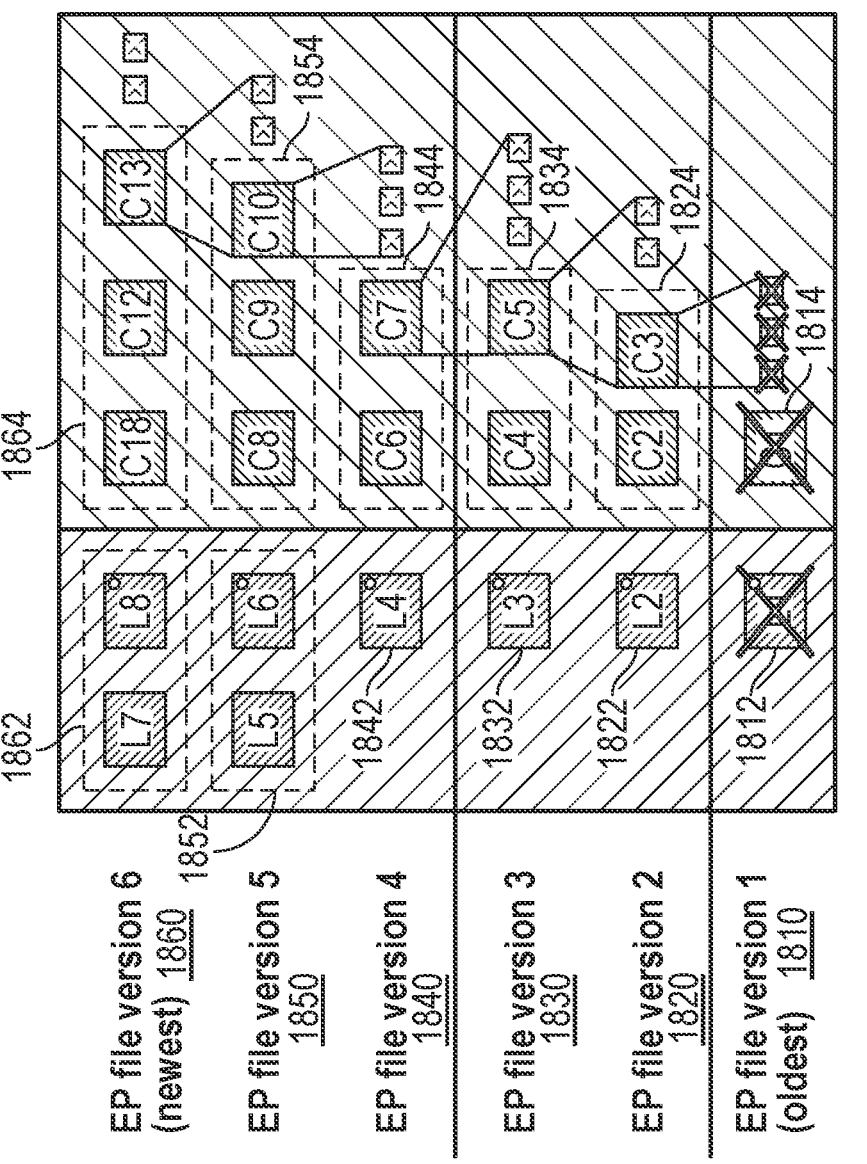
FIG. 18 illustrates examples of two-level data structures for storing metadata in accordance with some embodiments of the subject technology.

FIG. 18 illustrates examples of two-level data structures for storing metadata in accordance with some embodiments of the subject technology. Such a two-level data structure (also referred to as "2-level EP" or a "2-level EP file" herein) can at least store metadata corresponding to the aforementioned grouping expression properties and micro-partition statistics. More specifically, FIG. 18 is a schematic diagram of different versions of such a two-level data structure for storage of metadata in persistent storage (e.g., in the cloud) over various periods of time. In an embodiment, over time, data is received, processed, and/or stored in a given storage platform and/or the file system of the network-based database system 102. A different version of a two-level data structure can be generated after a period of time (e.g., a failsafe period, a data retention period, and the like) and/or a particular amount of subsequent metadata has been received and/or generated by the subject system. In an embodiment, the example two-level data structures of FIG. 18 are tree data structures with a respective one-way pointer from a root node (e.g., a node corresponding to grouping expression properties) to each of a set of leaf nodes (e.g., corresponding to one or more micro-partition statistics).

As illustrated, a first EP file version 1810 ("version 1") corresponds to an initial (e.g., "oldest") version of a 2-level EP file 1812 that is generated by a resource manager (e.g., compute service manager 108) for storage in persistent storage. As further illustrated, different subsequent versions of 2-level EP files include a second EP file version 1820 including a 2-level EP file 1822, a third EP file version 1830 including a 2-level EP file 1832, a fourth EP file version 1840 including a 2-level EP file 1842, a fifth EP file version 1150 including 2-level EP files 1852, and a sixth EP file version 1860 including 2-level EP files 1862. In FIG. 18, each EP file version is generated by the background consolidation service (provided by the compute service manager 108) e.g., each time when EP files get consolidated, a new EP file version is created.

Each of the aforementioned 2-level EP files contains both grouping expression properties and grouping micro-partition stats. In an example, each time a new EP file version gets created, a list of new compact EP files are created. For each newly created compact EP file, a grouping micro-partition stats (e.g., illustrated as EP file metadata in FIG. 12) and grouping EPs for columns are computed about all the added micro-partitions in that compact EP file, and saved in 2-level EP files. For example, L3 contains the grouping stats and EPs for C4 and C5.

In FIG. 18, the first EP file version 1810 is shown as being deleted (e.g., removed) from persistent storage, which can occur, in embodiment, as a new version of the 2-level EP file is generated by the subject system. As further shown, a compact EP file 1814 and delta EP files (e.g., smaller squares to the right of compact EP file 1814) are included in the first EP file version 1810.

In the second EP file version 1820, compact EP files 1824 are included, and delta EP files (e.g., smaller squares) are to the right of compact EP files 1824. The compact EP files and/or the delta files are the files containing micro-partition statistics and column expression properties as described in FIG. 12. In the third EP file version 1830, compact EP files 1834 are included, and delta EP files (e.g., smaller squares) are to the right of compact EP files 1834. In an embodiment, the second EP file version 1820 and the third EP file version 1830 are kept in storage during a data retention period and a failsafe period. In an example, a data retention period specifies a period of time for which historical data is preserved and queryable, and a failsafe period corresponds to a period of time during which historical data is recoverable by the subject system, and can start immediately after data passes its retention period.

The fourth EP file version 1840 includes compact EP files 1844, and delta EP files (e.g., smaller squares) are to the right of compact EP files 1844.

The fifth EP file version 1850 includes compact EP files 1854, and delta EP files (e.g., smaller squares) are to the right of compact EP files 1854. The sixth EP file version 1860 includes compact EP files 1864, and delta EP files (e.g., smaller squares) are to the right of compact EP files 1864.

In an embodiment, the second EP file version 1820 and the third EP file version 1830 are kept in storage during a data retention period.

In an embodiment, different versions of an EP file can be generated during a consolidation or "compaction" process of metadata as described above.

In an example, processing of a compacted EP file for a 2-level-EP file occurs in the background (e.g., as part of a background service or process provided by the compute service manager 108 as described before), which enables foreground usage to have a low latency thereby improving the functionality of a computer (e.g., the subject system or components thereof).

During compilation and optimization of a query on the database, a processor may scan cumulative table metadata (e.g., stored in a cache) to determine if a particular table includes information pertaining to the query. In response to determining, based on the cumulative table metadata, that the table includes information pertaining to the query, the processor may scan, from persistent storage, one of the grouping expression properties in FIG. 18 to determine which grouping of micro-partitions of the table include information pertaining to the query. In response to determining, based on a first cumulative expression property, that a first grouping of micro-partitions does not include information pertaining to the query, the processor however may discontinue database scanning of that first grouping of micro-partitions. In response to determining, based on a second cumulative expression property, that a second grouping of micro-partitions includes information pertaining to the query, the processor may proceed to scan expression properties, in persistent storage, for that second grouping of micro-partitions. The processor may efficiently determine which micro-partitions include pertinent data and which columns of which micro-partitions include pertinent data. The processor may proceed to scan only the relevant column (s) and micro-partition(s) from persistent storage that include information relevant to a database query. In this manner, a cost efficient technique for responding to a database query is provided by a 2-level EP file.

Figure 19:
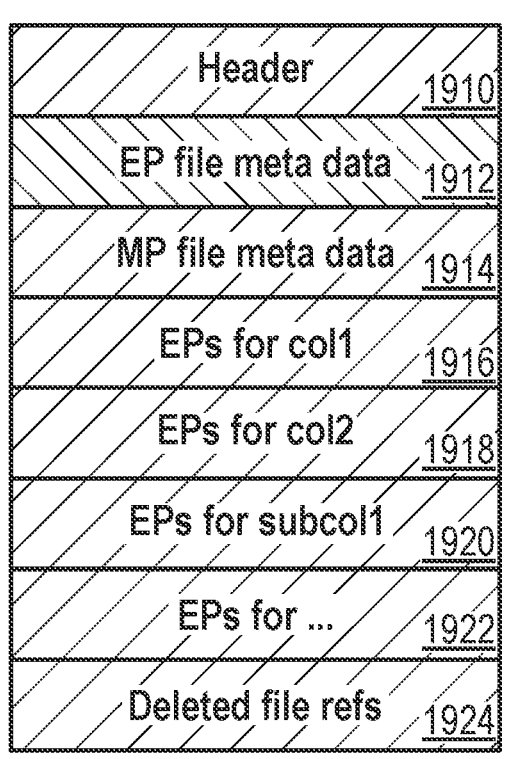
FIG. 19 illustrates example format for an EP file (e.g., for two-level data structures), which can be utilized for storage of metadata in accordance with some embodiments of the subject technology.

FIG. 19 illustrates example format for an EP file 1900 (e.g., for two-level data structures), which can be utilized for storage of metadata in accordance with some embodiments of the subject technology.

In an embodiment, the EP file 1900 includes blocks of bytes. The EP file 1900 includes a header 1910, EP file metadata 1912 (e.g., a serialized list of EP metadata objects), micro-partition file metadata 1914 (e.g., a serialized list of metadata objects), expression properties 1916 for a first column (e.g., each block includes an array of metadata per micro-partition file), expression properties 1918 for a second column (e.g., each block includes an array of metadata per micro-partition file), expression properties for a first sub-column 1920 (e.g., each block includes an array of metadata per micro-partition file), and expression properties 1922 for other columns/sub-columns (e.g., each block includes an array of metadata per micro-partition file). Further, the EP file 1900 includes information for deleted global file references 1924 (e.g., for metadata corresponding to data manipulation language events and the like).

In an embodiment, EP file metadata 1912 includes data for metadata objects where each metadata object includes information to identify a given EP file e.g., account ID, table ID, EP file version, start file ID, and the like.

Figure 20:
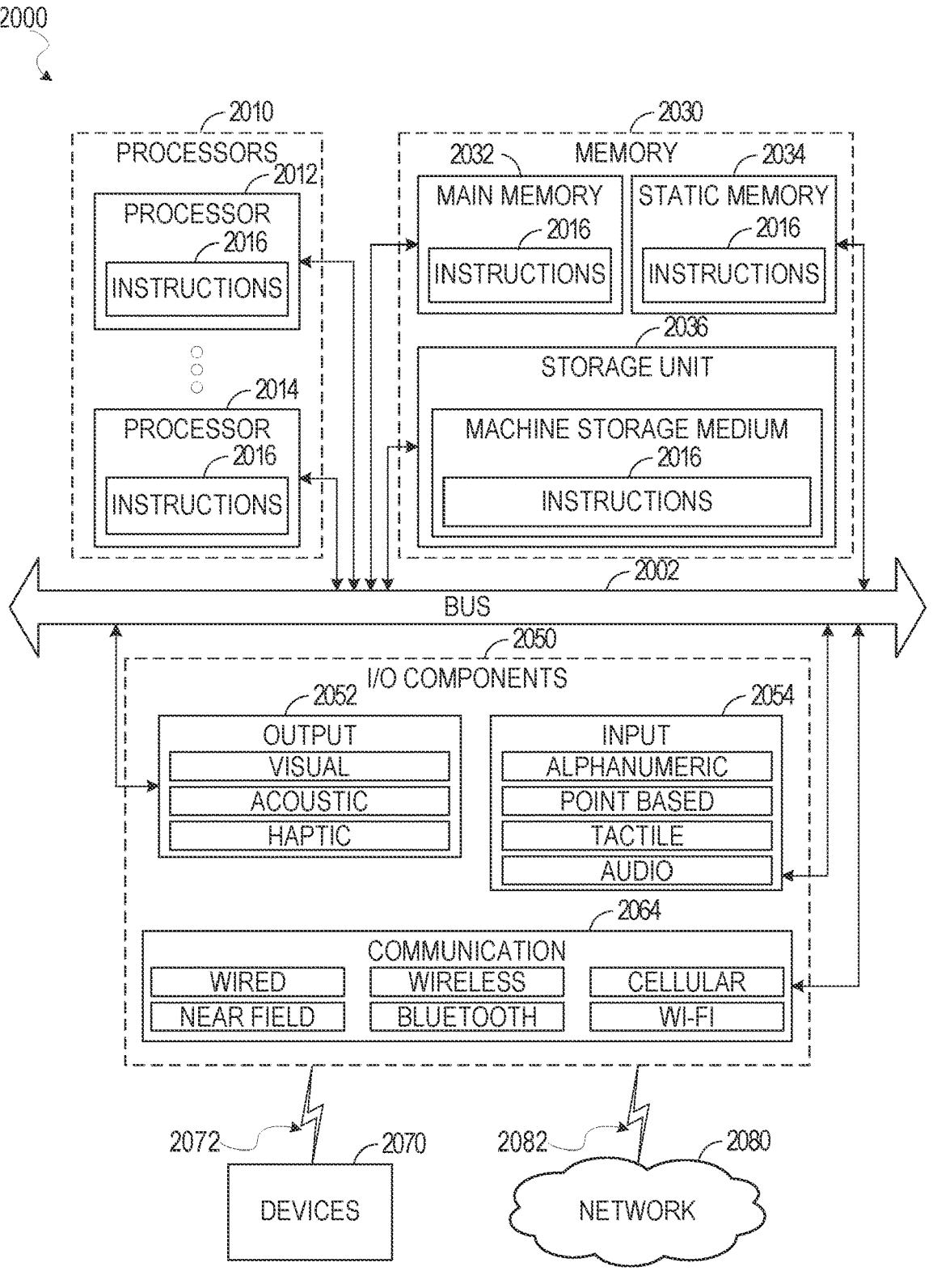
FIG. 20 illustrates a diagrammatic representation of a machine in the form of a computer system within which a set of instructions may be executed for causing the machine to perform any one or more of the methodologies discussed herein, in accordance with some embodiments of the present disclosure.

FIG. 20 illustrates a diagrammatic representation of a machine 2000 in the form of a computer system within which a set of instructions may be executed for causing the machine 2000 to perform any one or more of the methodologies discussed herein, according to an example embodiment. Specifically, FIG. 20 shows a diagrammatic representation of the machine 2000 in the example form of a computer system, within which instructions 2016 (e.g., software, a program, an application, an applet, an app, or other executable code) for causing the machine 2000 to perform any one or more of the methodologies discussed herein may be executed. For example, the instructions 2016 may cause the machine 2000 to execute any one or more operations of any one or more of the method 300 or 400. As another example, the instructions 2016 may cause the machine 2000 to implement portions of the data flows illustrated in the appropriate aforementioned figures. In this way, the instructions 2016 transform a general, non-programmed machine into a particular machine 2000 (e.g., the access management system 111, the compute service manager 108, the execution platform 110, the authentication and identity management system 118, and the computing devices described herein) that is specially configured to carry out any one of the described and illustrated functions in the manner described herein.

In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 2016, sequentially or otherwise, that specify actions to be taken by the machine 2000. Further, while only a single machine 2000 is illustrated, the term "machine" shall also be taken to include a collection of machines 2000 that individually or jointly execute the instructions 2016 to perform any one or more of the methodologies discussed herein.

The machine 2000 includes processors 2010, memory 2030, and input/output (I/O) components 2050 configured to communicate with each other such as via a bus 2002. In an example embodiment, the processors 2010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2012 and a processor 2014 that may execute the instructions 2016. The term "processor" is intended to include multi-core processors 2010 that may comprise two or more independent processors (sometimes referred to as "cores") that may execute instructions 2016 contemporaneously. Although FIG. 20 shows multiple processors 2010, the machine 2000 may include a single processor with a single core, a single processor with multiple cores (e.g., a multi-core processor), multiple processors with a single core, multiple processors with multiple cores, or any combination thereof.

The memory 2030 may include a main memory 2032, a static memory 2034, and a storage unit 2036, all accessible to the processors 2010 such as via the bus 2002. The main memory 2032, the static memory 2034, and the storage unit 2036 store the instructions 2016 embodying any one or more of the methodologies or functions described herein. The instructions 2016 may also reside, completely or partially, within the main memory 2032, within the static memory 2034, within the storage unit 2036, within at least one of the processors 2010 (e.g., within the processor's cache memory), or any suitable combination thereof, during execution thereof by the machine 2000.

The I/O components 2050 include components to receive input, provide output, produce output, transmit information, exchange information, capture measurements, and so on. The specific I/O components 2050 that are included in a particular machine 2000 will depend on the type of machine. For example, portable machines such as mobile phones will likely include a touch input device or other such input mechanisms, while a headless server machine will likely not include such a touch input device. It will be appreciated that the I/O components 2050 may include many other components that are not shown in FIG. 20. The I/O components 2050 are grouped according to functionality merely for simplifying the following discussion and the grouping is in no way limiting. In various example embodiments, the I/O components 2050 may include output components 2052 and input components 2054. The output components 2052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 2054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 2050 may include communication components 2064 operable to couple the machine 2000 to a network 2080 or devices 2070 via a coupling 2082 and a coupling 2072, respectively. For example, the communication components 2064 may include a network interface component or another suitable device to interface with the network 2080. In further examples, the communication components 2064 may include wired communication components, wireless communication components, cellular communication components, and other communication components to provide communication via other modalities. The devices 2070 may be another machine or any of a wide variety of peripheral devices (e.g., a peripheral device coupled via a universal serial bus (USB)). For example, as noted above, the machine 2000 may correspond to any one of the access management system 111, the compute service manager 108, the execution platform 110, the authentication and identity management system 118 and the devices 2070 may include the computing device 206 or any other computing device described herein as being in communication with the network-based database system 102 or the cloud storage provider system 104-1.

Executable Instructions and Machine Storage Medium

The various memories (e.g., 2030, 2032, 2034, and/or memory of the processor(s) 2010 and/or the storage unit 2036) may store one or more sets of instructions 2016 and data structures (e.g., software) embodying or utilized by any one or more of the methodologies or functions described herein. These instructions 2016, when executed by the processor(s) 2010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 2080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2080 or a portion of the network 2080 may include a wireless or cellular network, and the coupling 2082 may be a Code Division Multiple Access (CDMA) connection, a Global System for Mobile communications (GSM) connection, or another type of cellular or wireless coupling. In this example, the coupling 2082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2016 may be transmitted or received over the network 2080 using a transmission medium via a network interface device (e.g., a network interface component included in the communication components 2064) and utilizing any one of a number of well-known transfer protocols (e.g., hypertext transfer protocol (HTTP)). Similarly, the instructions 2016 may be transmitted or received using a transmission medium via the coupling 2072 (e.g., a peer-to-peer coupling) to the devices 2070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2016 for execution by the machine 2000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the aforementioned methods of the previously described figures may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The invention claimed is:

1. A network-based database system comprising:
   at least one hardware processor; and
   a memory storing instructions that cause the at least one hardware processor to perform operations comprising:
   generating an external volume, the external volume comprising a set of storage locations for at least one current file or a new file;
   generating a catalog integration, the catalog integration comprising an object that defines a source of metadata and schema for a table that the network-based database system does not manage, the catalog integration having no table format;
   generating an unmanaged table;
   performing a refresh operation of the unmanaged table, the refresh operation adding at least one file to the unmanaged table;
   receiving a first command to convert the unmanaged table to a managed table, the unmanaged table being controlled by an external catalog, and the managed table being controlled by the network-based database system as a metastore for the managed table;
   converting the unmanaged table to the managed table, the converting making the managed table into a writable table that provides a path for writing at least one other file;
   transitioning ownership of the unmanaged table's catalog from an external source to the network-based database system; and
   confirming that an external volume storing the managed table is writable by the network-based database system.

2. The network-based database system of claim 1, wherein the operations further comprise:
   generating the external volume;
   generating a catalog integration, the catalog integration comprising an object that defines a source of metadata and schema for a table that the network-based database system does not manage;
   generating an unmanaged table; and
   performing a refresh operation of the unmanaged table.

3. The network-based database system of claim 2, wherein generating the external volume is based on parameters comprising a name, a storage uniform resource locator (URL), and whether writes are allowed.

4. The network-based database system of claim 2, wherein generating the catalog integration is based on parameters comprising a catalog source, a table format, and a set of connection properties.

5. The network-based database system of claim 2, wherein generating the unmanaged table is based on parameters comprising an external volume name, a catalog name, a catalog table name, and an auto refresh parameter.

6. The network-based database system of claim 1, wherein the operations further comprise:
   verifying that the network-based database system has a write privilege and a delete privilege of the external volume.

7. The network-based database system of claim 1, wherein converting the unmanaged table to the managed table is based on a parameter indicating a table name of the unmanaged table.

8. The network-based database system of claim 1, wherein the refresh operation removes at least one file from the unmanaged table.

9. A method comprising:

generating an external volume, the external volume comprising a set of storage locations for at least one current file or a new file;

generating a catalog integration, the catalog integration comprising an object that defines a source of metadata and schema for a table that a network-based database system does not manage, the catalog integration having no table format;

generating an unmanaged table;

performing a refresh operation of the unmanaged table, the refresh operation adding at least one file to the unmanaged table;

receiving a first command to convert the unmanaged table to a managed table, the first command being received by a network-based database system, the unmanaged table being controlled by an external catalog, and the managed table being controlled by the network-based database system as a metastore for the managed table;

converting the unmanaged table to the managed table, the converting making the managed table into a writable table that provides a path for writing at least one other file;

transitioning ownership of the unmanaged table's catalog from an external source to the network-based database system; and confirming that an external volume storing the managed table is writable by the network-based database system.

10. The method of claim 9, further comprising:

generating the external volume;

generating a catalog integration, the catalog integration comprising an object that defines a source of metadata and schema for a table that the network-based database system does not manage;

generating an unmanaged table; and performing a refresh operation of the unmanaged table.

11. The method of claim 10, wherein generating the external volume is based on parameters comprising a name, a storage uniform resource locator (URL), and whether writes are allowed.

12. The method of claim 10, wherein generating the catalog integration is based on parameters comprising a catalog source, a table format, and a set of connection properties.

13. The method of claim 10, wherein generating the unmanaged table is based on parameters comprising an external volume name, a catalog name, a catalog table name, and an auto refresh parameter.

14. The method of claim 9, further comprising:

verifying that the network-based database system has a write privilege and a delete privilege of the external volume.

15. The method of claim 9, wherein converting the unmanaged table to the managed table is based on a parameter indicating a table name of the unmanaged table.

16. A non-transitory computer-storage medium comprising instructions that, when executed by one or more processors of a machine, configure the machine to perform operations comprising:

generating an external volume, the external volume comprising a set of storage locations for at least one current file or a new file;

generating a catalog integration, the catalog integration comprising an object that defines a source of metadata and schema for a table that a network-based database system does not manage, the catalog integration having no table format;

generating an unmanaged table;

performing a refresh operation of the unmanaged table, the refresh operation adding at least one file to the unmanaged table;

receiving a first command to convert the unmanaged table to a managed table, the first command being received by a network-based database system the unmanaged table being controlled by an external catalog, and the managed table being controlled by the network-based database system as a metastore for the managed table;

converting the unmanaged table to the managed table, the converting making the managed table into a writable table that provides a path for writing at least one other file;

transitioning ownership of the unmanaged table's catalog from an external source to the network-based database system; and confirming that an external volume storing the managed table is writable by the network-based database system.

* * * * *